(12) United States Patent
Elmaghbub et al.

(10) Patent No.: US 11,943,003 B2
(45) Date of Patent: Mar. 26, 2024

(54) WIRELESS DEVICE CLASSIFICATION APPARATUS AND METHOD

(71) Applicant: Oregon State University, Corvallis, OR (US)

(72) Inventors: Abdurrahman Elmaghbub, Corvallis, OR (US); Bechir Hamdaoui, Corvallis, OR (US)

(73) Assignee: Oregon State University, Corvallis, OR (US)

( * ) Notice: Subject to any disclaimer, the term of this patent is extended or adjusted under 35 U.S.C. 154(b) by 269 days.

(21) Appl. No.: 17/497,550

(22) Filed: Oct. 8, 2021

(65) Prior Publication Data
US 2022/0116130 A1 Apr. 14, 2022

Related U.S. Application Data

(60) Provisional application No. 63/090,687, filed on Oct. 12, 2020.

(51) Int. Cl.
*H04B 17/13* (2015.01)
*G06F 18/214* (2023.01)
*G06F 18/23* (2023.01)
*H04B 17/391* (2015.01)
*H04W 4/20* (2018.01)

(52) U.S. Cl.
CPC ....... *H04B 17/3913* (2015.01); *G06F 18/214* (2023.01); *G06F 18/23* (2023.01); *H04W 4/20* (2013.01)

(58) Field of Classification Search
CPC ... H04B 17/3913; G06F 18/214; G06F 18/23; G06F 18/24137; H04W 4/20; G06N 3/045; G06N 3/044; G06N 3/048; G06N 3/084
See application file for complete search history.

(56) References Cited

U.S. PATENT DOCUMENTS

2016/0005042 A1\* 1/2016 Tervo .................. G06Q 20/425
705/67
2021/0334626 A1\* 10/2021 Hang .................. G06V 10/454
(Continued)

OTHER PUBLICATIONS

Blachman, "Band-pass nonlinearities," IEEE Transactions on Information Theory, vol. 10, No. 2, pp. 162-164, 1964.
(Continued)

*Primary Examiner* — Steven Hieu D Nguyen
(74) *Attorney, Agent, or Firm* — MUGHAL GAUDRY & FRANKLIN PC

(57) ABSTRACT

A scheme for identifying wireless devices by capturing out-of-band information in addition to in-band information from wireless devices for enabling accurate classification of wireless devices. Both the in-band and out-of-band spectrum emissions of the received signal are used to capture hardware signatures and features. These hardware signatures are used to discriminate different wireless devices uniquely and efficiently, even when the devices have the same hardware with significantly reduced distortions. The out-of-band information can be extracted using radios with software defined capabilities. Deep learning-based device classification technique is applied that uses IQ samples collected from the RF signals to efficiently identify and classify high-performing transmitters that have the same, minimally distorted hardware components.

20 Claims, 13 Drawing Sheets

(56) References Cited

U.S. PATENT DOCUMENTS

| | | | | |
|---|---|---|---|---|
| 2021/0334705 | A1* | 10/2021 | Akbar | G06N 20/20 |
| 2022/0027328 | A1* | 1/2022 | Banerjee | H04L 12/2856 |
| 2022/0311762 | A1* | 9/2022 | Bhuyan | H04L 63/0861 |

OTHER PUBLICATIONS

D'Apuzzo et al., "Modeling dac output waveforms," IEEE Transactions on Instrumentation and Measurement, vol. 59, No. 11, pp. 2854-2862, 2010.

Ding, "Digital predistortion of power amplifiers for wireless applications," Ph.D. dissertation, Georgia Institute of Technology, 2004.

Elmaghbub et al., "Leveraging Hardware-Impaired Out-of-Band Information Through Deep Neural Networks for Robust Wireless Device Classification," arXiv.org > eess > arXiv:2004.11126. Submitted on Apr. 23, 2020. 9 pages.

Gard et al., "Characterization of spectral regrowth in microwave amplifiers based on the nonlinear transformation of a complex gaussian process," IEEE Transactions on Microwave Theory and Techniques, vol. 47, No. 7, pp. 1059-1069, 1999.

Gardner, "Phaselock techniques. 2nd cd," John Wilcy and Sons, New York, 1979.

Khanzadi et al. "Calculation of the performance of communication systems from measured oscillator phase noise," IEEE Transactions on Circuits and Systems I: Regular Papers, vol. 61, No. 5, pp. 1553-1565, 2014.

L. Smaini, RF Analog Impairments Modeling for Communication Systems Simulation. Wiley Online Library, 2012.

Liu et al., "Deep neural network architectures for modulation classification," in 2017 51st Asilomar Conference on Signals, Systems, and Computers. IEEE, 2017, pp. 915-919.

Morgan et al., "A generalized memory polynomial model for digital predistortion of rf power amplifiers," IEEE Transactions on signal processing, vol. 54, No. 10, pp. 3852-3860, 2006.

Restuccia et al., "Deepradioid: Real-time channel-resilient optimization of deep learning-based radio fingerprint-ing algorithms," in Proc. of the 20th ACM International Symposium on Mobile Ad Hoc Networking and Computing, 2019, pp. 51-60.

Saleh, "Frequency-independent and frequency-dependent nonlinear models of twt amplifiers," IEEE Transactions on communications, vol. 29, No. 11, pp. 1715-1720, 1981.

Sankhe et al. "Oracle: Optimized radio classification through convolutional neural networks," in IEEE Infocom 2019- EEE Conference on Computer Communications. IEEE, 2019, pp. 370-378.

Svitek et al., "Dc offsets in direct-conversion receivers: Characterization and implications". IEEE Microwave Magazine, vol. 6, No. 3, pp. 76-86, 2005.

Tanaka et al., "Unwanted emissions of multi-carrier transmitter in spurious domain," in 26th Intl Communications Satellite Systems Conference (ICSSC), 2008.

Wang et al., "Wireless physical-layer identification: Modeling and validation," IEEE Transactions on Information Forensics and Security, vol. 11, No. 9, pp. 2091-2106, 2016.

Zhou et al., "Predicting spectral regrowth of nonlinear power amplifiers," IEEE Transactions on Communications, vol. 50, No. 5, pp. 718-722, 2002.

* cited by examiner

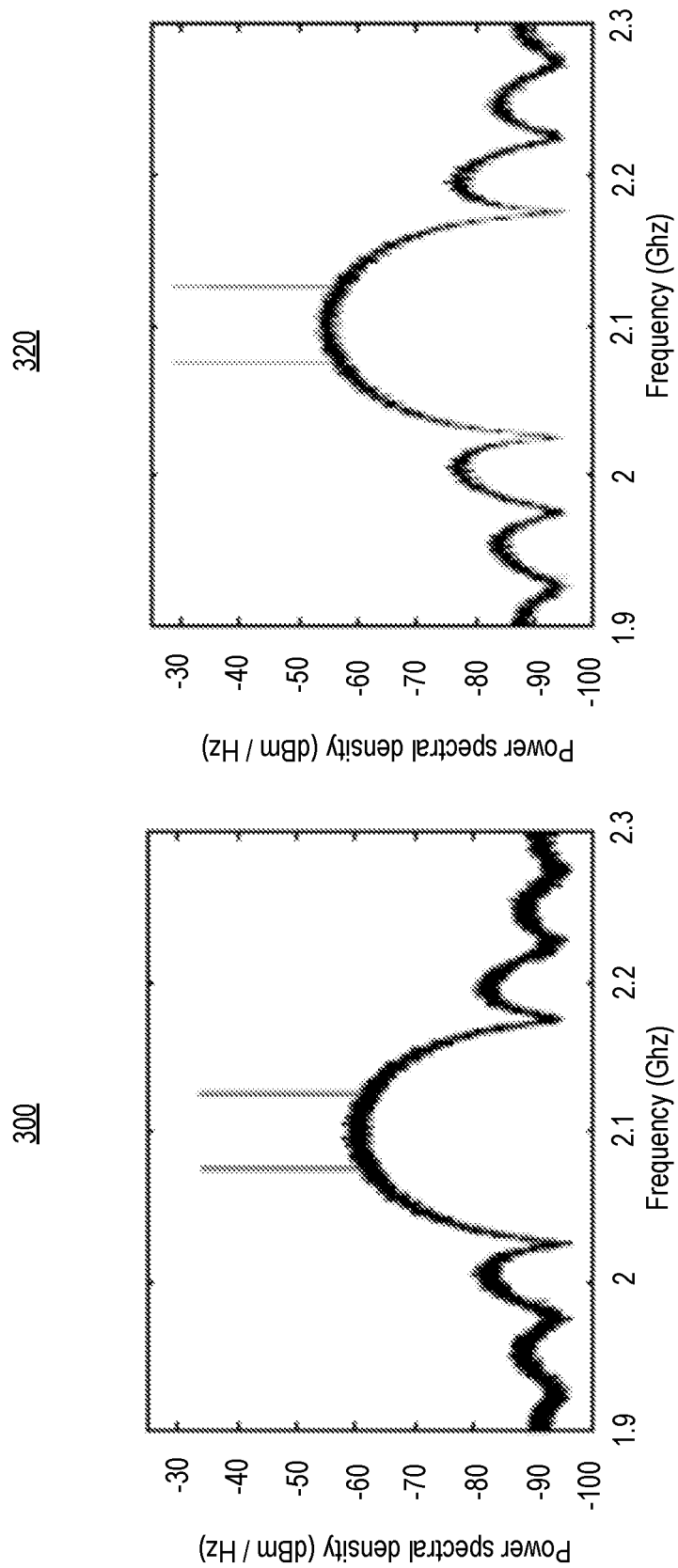

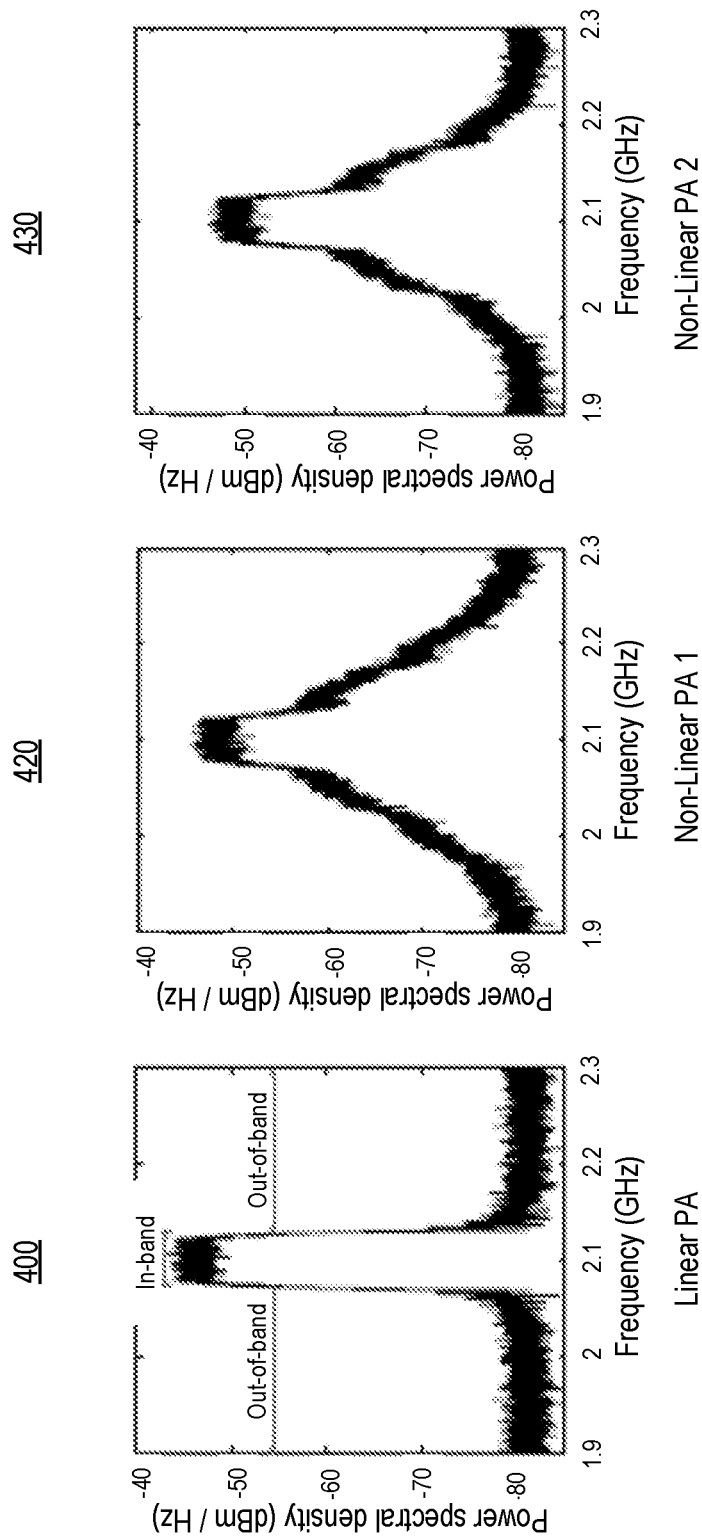

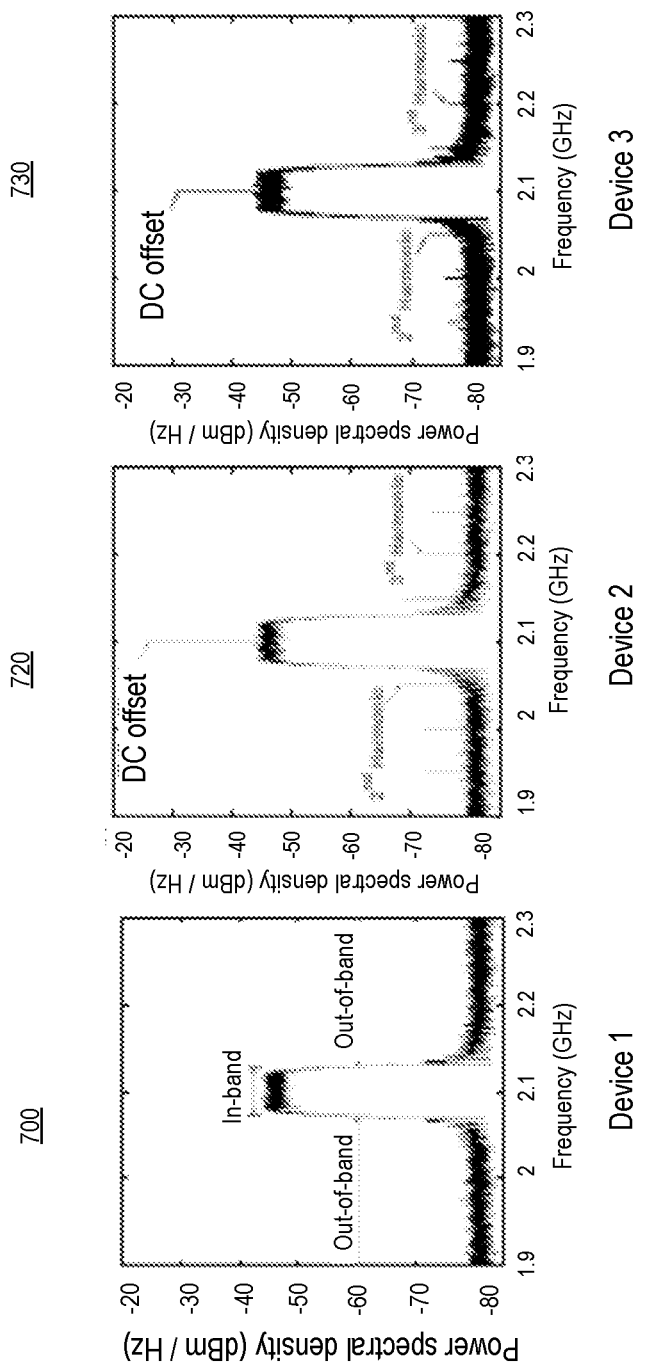

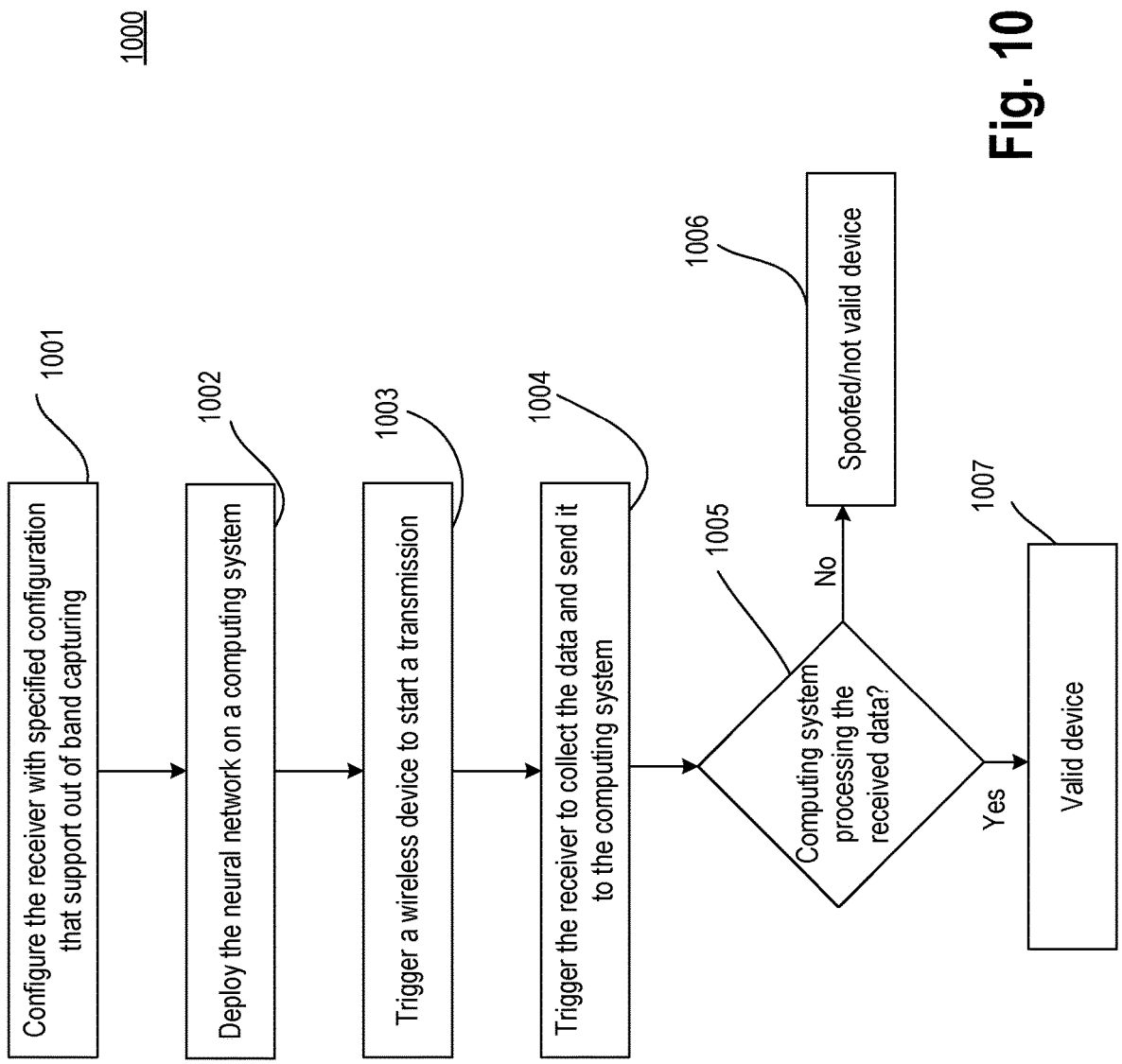

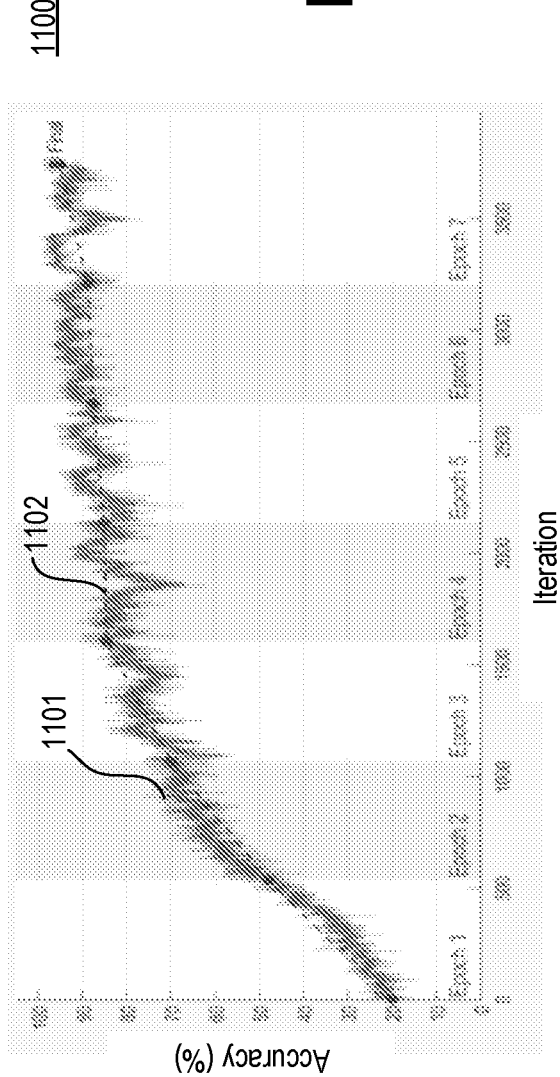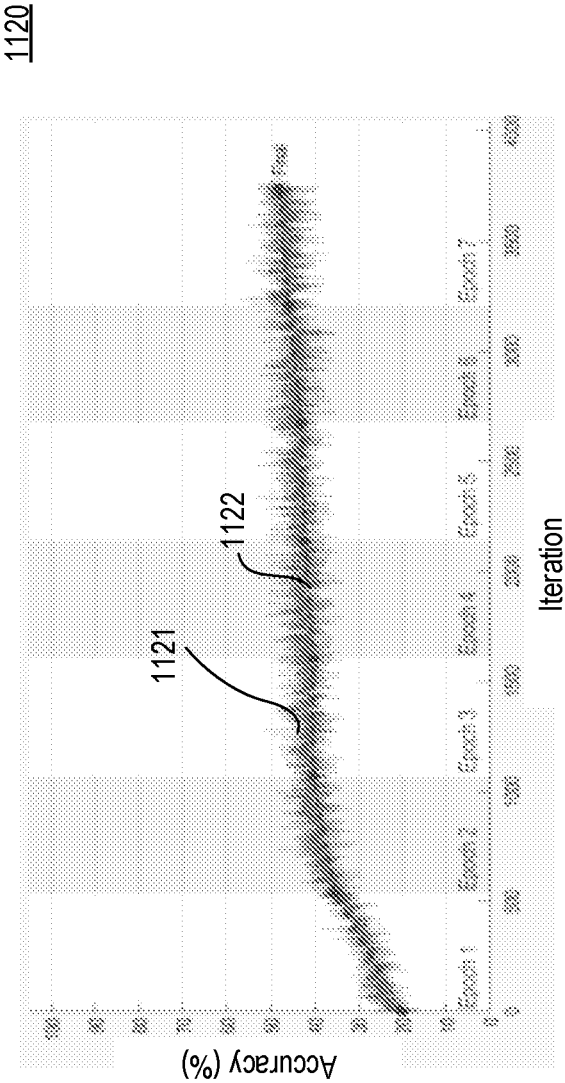

Fig. 12A

Fig. 12B

WIRELESS DEVICE CLASSIFICATION APPARATUS AND METHOD

CLAIM FOR PRIORITY

This application claims the benefit of priority of U.S. Provisional Patent Application No. 63/090,687, filed Oct. 12, 2020, and titled, "WIRELESS DEVICE CLASSIFICATION APPARATUS AND METHOD," which is incorporated by reference in its entirety for all purposes.

BACKGROUND

With the proliferation of wireless devices in the era of Internet of Things (IoT) and next generations of wireless communication systems, billions of devices will be connected to the internet creating smart homes, smart facilities, and smart cities which presumably would make our lives more comfortable. Yet, this massive connectivity can also be seen as vulnerable points which hackers and bad actors can exploit to cause harm to individuals and communities.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIGS. 3A-B illustrate plots showing the nonlinearly effect under Binary Frequency Shift Key (BFSK) modulation for a linear power amplifier (PA) and a non-linear PA, respectively.

FIGS. 4A-C illustrate plots showing the nonlinearity effect under 16 Quadrature Amplitude Modulation (QAM) for linear PA, non-linear PA 1 and non-linear PA 2, respectively.

FIGS. 7A-C illustrate plots showing the DC offset effect for device 1 (ideal mixer with DC offset=0), device 2 (DC offset: I=0.9 and Q=0.9), device 3 (DC offset I=0.5 and Q=0.5), respectively.

FIG. 10 illustrates a flowchart showing the scheme to identify a wireless device, in accordance with some embodiments.

FIGS. 11A-B illustrate plots showing training and validation accuracy of the scheme of FIG. 10 that uses in-band and out-of-band radiation, and existing technique, respectively.

FIGS. 12A-B illustrate confusion matrices for the scheme of FIG. 10 that uses in-band and out-of-band radiations, and existing technique, respectively.

DETAILED DESCRIPTION

Figure 1:
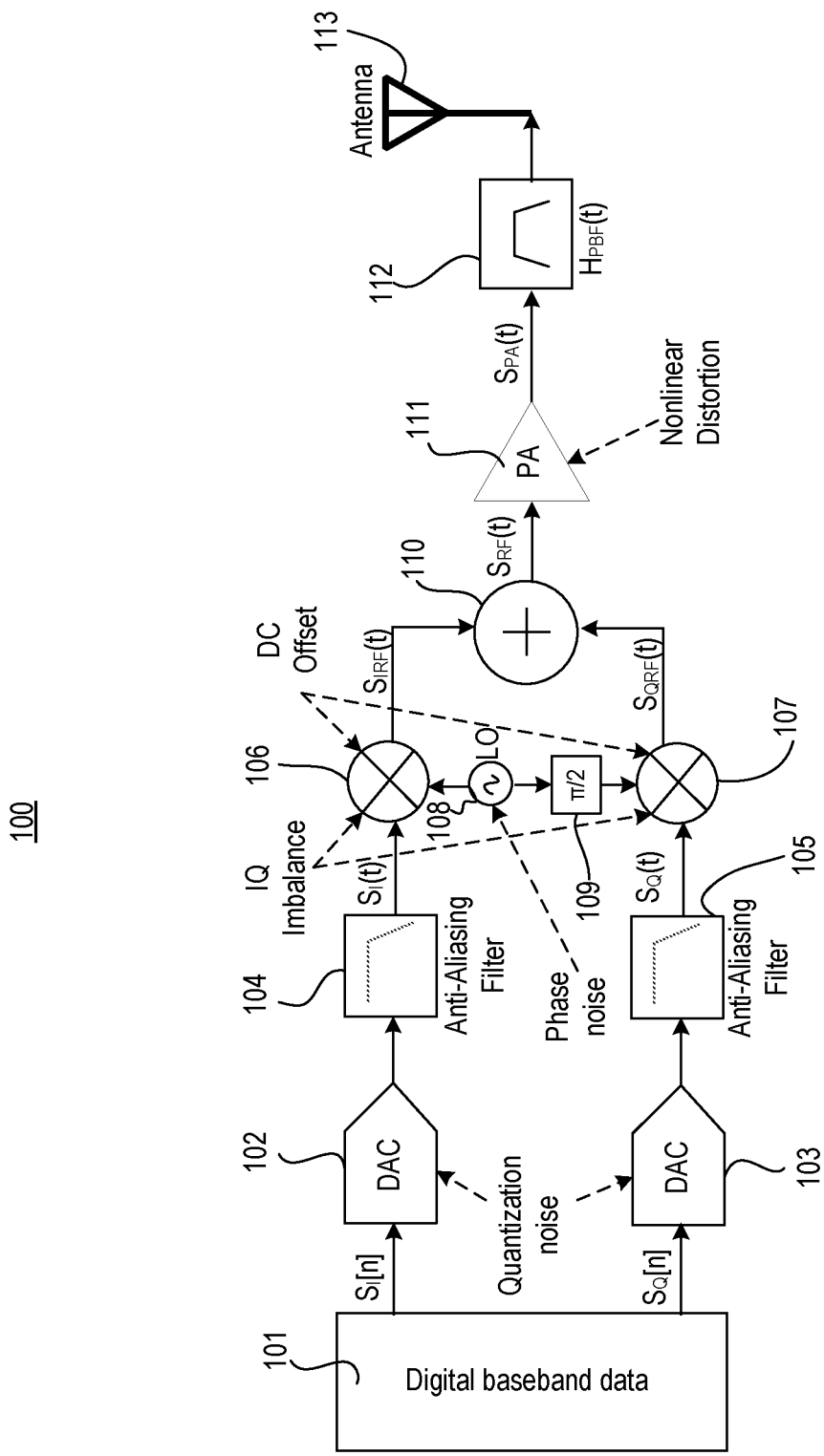
FIG. 1 illustrates a transceiver with various Radio Frequency (RF) impairments.

The lack of reliable and suitable methods for wireless classification and/or authentication in cellular communication towers and indoor wireless networks might lead to a direct negative impact on individuals, communities, and nations. Impersonation attacks, identity theft, and illegal access to a spectrum are some of the problems that occur when it is not possible to reliably identify the real identity of a wireless device. Impersonation attacks occur when someone pretends to be someone else. Such attacks allow bad actors to commit crimes in someone else's name. Identity theft usually starts by stealing personal information and then using it to gain access to confidential and/or classified information or accounts which might lead to a huge damage for individuals, companies, communities, and governments. Illegitimate access to the spectrum may cause a loss of highly secure information, and a degradation on the quality of the service.

Radio frequency spectrum is one of the most expensive commodities in the technology space. A radio frequency spectrum is divided into small chunks for a huge number of applications, from Amplitude Modulation (AM) and Frequency Modulation (FM) radio, television, and cellular networks to walkie-talkies, satellite communications, and military applications. Federal agencies such as the Federal Communication Commission (FCC) sell, regulate, and monitor the use of the spectrum. Illegal access to a licensed portion of the spectrum can cause a lot of damage to the service that is provided in that portion of the spectrum.

Wireless network attacks and illegal spectrum access can be immensely overwhelming as it could lead to serious problems such as leaking sensitive and/or classified information, shutting down facilities, disrupting emergency and military services, degrading network performance for primary users, and other indirect financial and reputation impacts. Some security identification solutions use simple digital identifiers, such as Media Access Control (MAC) addresses, Internet Protocol (IP) addresses, and Services Set Identifier (SSID). However, most of the security identification solutions are not effective in detecting advanced and complicated attacks since those digital identifiers can be easily spoofed by existing software. Therefore, a more secure solution that does not only depend on simple digital identifiers is desired.

One approach to identifying wireless devices is to use a similarity-based approach which involves comparing an observed signature of a given wireless device with provided signatures in a reference database. This approach uses techniques such as supervised Bayesian and Wavelet analysis to generate the fingerprint. However, the challenge with this approach is that it requires a priori knowledge of vendor specific features to be used as similarity measures. It also suffers from the scalability issue in that more specific features need to be added to the reference list every time a new type of device is to be recognized. Moreover, vendor-specific features are usually accessible or can be reverse-engineered, which make this approach very vulnerable to adversary attacks.

Another approach to identifying wireless devices is a typical classification approach that relies on a set of hand-selected features of a given signal to perform the classification task. Some of the prevalent features are amplitude, phase, mean, variance, preamble, and spectral domain features. The extracted features are fed to classification methods such K-nearest neighbor (K-NN), Support Vector Machine (SVM), and simple Nearest Neighbor (NN). The challenge with this approach is that it requires expert knowledge and many trials and error iterations to find the optimal features. Different protocols do not share the same features, and hence, in many cases, we end up with protocol-specific or vendor-specific approaches that suffers from scalability and generalization issues.

Another approach to identifying wireless devices is to use the power of deep learning (e.g., Convolution Neural Networks (CNN)s and Recurrent Neural Networks (RNNs)) to learn the appropriate features from the input using the hidden layers and use them to classify different signals. However, a shortcoming of this approach is that it suffers from poor performance when it comes to classifying high-end, bit-similar devices that are sending the same packets (the worst-case scenario). The variability among the hardware implementations in the high-end devices is extremely minimal, which makes the task of recognizing those variations in the presence of channel and environment impact is extremely challenging.

Various embodiments describe a scheme for identifying wireless devices by capturing out-of-band information in addition to in-band information from wireless devices for enabling accurate classification of wireless devices. Both the in-band and out-of-band spectrum emissions of the received signal are used in establishing the hardware signatures. These hardware signatures are unique and discernible among devices, even when devices have the same hardware with significantly reduced distortions. In some embodiments, the out-of-band information can be extracted using radios with software defined capabilities. Some embodiments use a deep learning-based device classification technique that uses I/Q samples representing the RF signals to efficiently identify and classify high-performing transmitters that have the same, minimally distorted hardware components.

There are many technical effects of various embodiments. The scheme of various embodiments achieves high accuracy of device identification. For example, the scheme achieves about 96% accuracy even when the transmitters of the wireless devices have similar features. The scheme of various embodiments is scalable in that it can distinguish among large numbers of minimally distorted devices with the same hardware, regardless of their protocol and/or software configurations. The scheme of various embodiments is robust against signature cloning and modification and uses little to no changes at the transmitters. The scheme of various embodiments incurs minimal extra processing at the receiver side that can be performed with existing hardware. Other technical effects will be evident from the various embodiments and figures.

The embodiments of the disclosure will be understood more fully from the detailed description given below and from the accompanying drawings of various embodiments of the disclosure, which, however, should not be taken to limit the disclosure to the specific embodiments, but are for explanation and understanding only.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction, and may be implemented with any suitable type of signal scheme.

It is pointed out that those elements of the figures having the same reference numbers (or names) as the elements of any other figure can operate or function in any manner like that described but are not limited to such.

Radio Frequency (RF) transmitters acquire benign hardware impairments during manufacturing and assembly stages. These device-specific impairments cause the transmitted RF signals to deviate from their ideal values, thereby establishing unique signatures for their corresponding devices. Despite the many great efforts aimed at designing hardware techniques that can eliminate or limit these hardware impairments so that they fall within tolerable ranges, these impairments cannot be eliminated completely. The scheme of various embodiments exploits such impairments to provide and enable efficient device classification. Described herein is a closer look at the sources, modeling, and impact of the most significant transmitter-specific impairments. These impairments become the basis of device identification and/or classification in accordance with various embodiments.

FIG. 1 illustrates transceiver 100 with various RF impairments. The section starts with an analysis of quantization noise and clock source modulation. Transceiver 100 comprises source 101 which provides digital base-band data, digital-to-analog converters (DACs) 102 and 103, anti-aliasing filter 104 and 105, mixers 106 and 107, local oscillator (LO) 108, phase shifter 109, adder or summer 110, PA 111, band-pass filter 112, and antenna 113 coupled as shown. An interface between a digital processing unit (DSP) and an analog front-end (AFE) component in modern transmitters includes one or more DACs that convert digital baseband sequences (e.g., $S_I[n]$ for the in-phase (I) path component) to their equivalent time-continuous analog signals (e.g., $S_I(t)$). Digital baseband sequences $S_I[n]$ and $S_Q[n]$ are generated by source 101. Source 101 can be any suitable source. In some examples, the source is a digital signal processor. DACs 102 and 103 use different variations of zero order-hold circuits to generate staircase continuous waveforms as an approximation of the smooth waveforms. The high frequency components represented by the sharp edges of the staircase pattern are removed by Anti-Aliasing filters 104 and 105. A limited number of DAC resolution bits, finite clipping levels, and nonlinearity nature of real DACs altogether result in the degradation of the signal-to-noise (SNR) values and the transmitter performance in general. The main three sources of a DAC's distortions include: horizontal quantization (HQ), vertical quantization (VQ), and clock source modulation (CM), and whose aggregated impact on the DAC functionality can be modelled as additive terms superimposed on the ideal analog output. For instance, considering the input $S_I[n]$, the output $y(S_I[n])$ of DAC 102 in the I path can be modelled as:

$$y(S_1[n]) = S_1(t) + y_{S_1}^{HQ}(t) + y_{S_1}^{VQ}(t) + y_{S_1}^{CM}(t) \qquad (1)$$

where $y_{S_1}^{HQ}(t)$, $y_{S_1}^{HQ}(t)$, and $y_{S_1}^{CM}(t)$ represent HQ, VQ, and CM distortions, respectively. HQ distortion represents the built-in discrete nature of the DAC output since it produces staircase patterns by holding the sample value during the sampling period. Anti-Aliasing filters 104 and 105 are used to eliminate the superimposed frequency components due to this discrete nature. However, interfering spurious terms still appear closer to the bandwidth of the output signal when the generating frequency is not sufficiently greater than the Nyquist rate. This effect can be modelled as:

$$y_{S_1}^{HQ}(t) = \sum_{n=-\infty}^{\infty} S_I[n] g\left(\frac{t - nT_g}{T_g}\right) - S_I(t) \qquad (2)$$

where $g(\theta)$ is a unitary pulse with $0 \le \theta \le 1$ and $T_g$ is the generation time period. Here, the in-phase (I) path component is used as an example to illustrate and explain the presented concepts. Similar analysis and illustration can be done for the case of the quadrature (Q) path component. The time-domain instability of the clock source is what leads to periodic variation in the generating period, resulting in the CM impairment, which in turn generates unwanted spurious components in the signal spectrum and can be modeled as:

$$y_{S_1}^{CM}(t) = \sum_{n=-\infty}^{\infty} S_1[n] h_n(t - nT_g) \qquad (3)$$

where the function $h_n(t)$ is defined as:

$$h_n(t) = -\text{sign}(\Delta_n) g\left(\frac{t - nT_g}{\Delta_n}\right) + \text{sign}(\Delta_{n+1}) g\left(\frac{t - (n+1)T_g}{\Delta_{n+1}}\right) \qquad (4)$$

where $\text{sign}(\theta)$ is the sign function, and $\Delta_n$ is the deviation of the clock from its ideal value. The finite resolution of DACs 102 and 103 requires rounding the samples values to the nearest voltage level, referred to above as vertical quantization or VQ, giving rise to a quantization distortion proportional to the DAC resolution. Like the previous DAC impairments, VQ distortion increases the spurious content in the spectrum as well. It can be modelled as:

$$y_{S_1}^{VQ}(t) = \sum_{n=-\infty}^{\infty} \left(\hat{S}_I[n] + T[\hat{S}_I[n]] - S_I[n]\right)\left(g\left(\frac{t - nT_g}{\Delta_n}\right) + h_n(t - nT_g)\right) \qquad (5)$$

where $T[\hat{S}_1[n]]$ is the Integral Nonlinearity (INL) term, which is a measure of the deviation of the output values from the ideal, and $\hat{S}_1[n]$ is the approximated signal values. In ideal DAC, $T[\hat{S}_1[n]] = 0$, making the VQ term go to zero. Each of these three DAC distortions (VQ, HQ, and CM) is hardware dependent, and hence, can be exploited as a feature or signature to distinguish one transmitter from another.

This section describes the IQ imbalance. Zero Intermediate Frequency (IF) or direct transmitters, such as the one shown in FIG. 1, leverage the quadrature mixer configuration to implement the up conversion of the baseband signal without the need for using any filtering methods. It does so by separately (in parallel) upconverting, at the carrier frequency $\omega_c$, the two in-phase (I) baseband modulated component, $S_1(t) = A(t)\cos(\varnothing(t))$, and quadrature (Q) baseband modulated component, $S_Q(t) = A(t)\sin(\varnothing(t))$, using two independent mixers 106 and 107 fed by local oscillator (LO) 108 tone shifted by 90° by phase shifter 109 from one another. Assuming perfectly matched I and Q paths, the two outputs are summed up, yielding the bandpass modulated signal (see FIG. 1):

$$S_{RF}(t) = A(t)\cos(\varnothing(t))\cos(\omega_c t) - A(t)\sin(\varnothing(t))\sin(\omega_c t) \qquad (6)$$

Any amplitude mismatch $\Delta\alpha$ or phase deviation $\Delta\theta$ between the I and Q path components that can be caused by the DAC (e.g., DAC 104 and/or DAC 106) and/or mixer (e.g., mixer 106 and/or mixer 107) hardware impairments lead to imperfect image cancellation and result in residual energy at the mirror frequency $-\omega_c$, causing interference and signal-to-noise ratio (SNR) degradation. This amplitude mismatch and phase deviation, also known as IQ imbalance, can be quantified by measuring the power ratio between the image and the desired signal, which depends on $\Delta\alpha$ and $\Delta\theta$. When using real mixers with amplitude and phase imbalances of $\Delta\alpha$ and $\Delta\theta$, the upconverted (distorted) signal becomes:

$$S_{RF}(t) = 1(1 - \Delta\alpha)S_1(t)\cos(\omega_c t) - S_Q(t)\sin(\omega_c t + \Delta\theta) \qquad (7)$$

Now when masking all other hardware impairments (e.g., assuming all other hardware components are ideal except DACs and mixers), the distorted complex baseband signal $\tilde{R}(t) = S_{RF}(t)e^{-j\omega_c t}$ down-converted at the receiver is:

$$\tilde{R}(t) = [(1 - \Delta\alpha)S_1(t)\cos(\omega_c t) - jS_Q(t)\sin(\omega_c t + \Delta\theta)] \times [\cos(\omega_c t) - j\sin(\omega_c t)] \qquad (8)$$

After some math manipulations and clearing the terms appearing at twice the carrier frequency (which are filtered out via low-pass filtering at the receiver), Eq. (8) yields:

$$\tilde{R}(t) = \left(\frac{1 - \Delta\alpha}{2}\right)S_I(t) + j\left(\frac{\sin(\Delta\theta) - j\cos(\Delta\theta)}{2}\right)S_Q(t). \qquad (9)$$

Therefore, IQ imbalances manifest in in-band and out-of-band signal distortions that are exploited to increase device signature separability and classification accuracy, in accordance with some embodiments.

The following section describes the DC offset. Ideal mixers output the product of the two signals coming from the input and the local oscillator (LO) ports, which comprises two terms, one appearing at the summation of the multiplied frequencies and one at their subtraction. However, due to hardware impairments, real mixers also produce some other unwanted emissions at different frequencies. Of a particular importance is a spike that appears at the center of the desired signal spectrum, known as DC offset, which cannot be easily filtered out because of its location in the middle of the message spectrum. DC offset impairments distort signal constellations and increase the error vector magnitude.

There are two main sources of DC offsets: carrier leakage and second-order nonlinearity. Carrier leakage results from the LO leakage coming from the poor isolation between the three mixer ports limited by the different coupling effects. Thus, a strong LO signal can leak through unintended paths toward the mixer output port and appear at the middle of the desired signal spectrum, generating a static DC value at the receiver. For example, when mixing the in-phase component $S_1(t)$ while considering this LO leakage, the mixer output becomes:

$$S_{1\,RF} = S_1(t)\cos(\omega_c t) + \vartheta_{lo}\cos(\omega_c t) \qquad (10)$$

where $\vartheta_{lo}\cos(\omega_c t)$ is the unmodulated carrier term that leaks through the mixer output port and appears at the middle of the spectrum, and where $\vartheta_{lo}$ is a hardware-specific feature that varies from a mixer to another.

The second source of DC offset is second-order nonlinearity. When a single tone signal passes through a second-order nonlinearity system, the output signal exhibits frequency components at the integer multiple of the input frequency. To illustrate, consider feeding the in-phase baseband component to the mixer while considering only the nonlinearity up to the second order and ignoring the LO leakage effect. The output of the mixer in this case becomes:

$$S_{1\,RF} = \alpha S_1(t)\cos(\omega_c t) + \alpha_2 S_1^2 \cos^2(\omega_c t) \tag{11}$$

where $\alpha_1$ and $\alpha_2$ are the parameters that model the mixer's first- and second-order nonlinearity terms. When replacing $S_1(t)$ by its expression $A(t)\cos(\varphi(t))$, the second-order nonlinearity term—the one responsible for the DC component—can be written as:

$$\alpha_2 S_1^2 \cos^2(\omega_c t) = \frac{\alpha_2 A^2(t)}{4} + \frac{\alpha_2 A^2(t)}{8}[2\cos(2\omega_c t) + \\ 2\cos(2\varphi(t)) + \cos(2(\varphi(t) - \omega_c t)) + \cos(2(\varphi(t) + \omega_c t))] \tag{12}$$

Note that the first term in Eq. (12) represents the DC component, and it is affected by the nonlinearity distortion captured by the parameter $\alpha_2$. The characteristics of the DC component are determined by both the silicon-level circuitry of the LO and the second-order nonlinearity of the device. Therefore, DC offsets also contribute to the establishment of unique signatures and hardware features and are leveraged for uniquely identifying transmitters among one another, in accordance with some embodiments The following section describes the phase noise. Local oscillators (LOs) are fundamental blocks in RF transmitter architectures. They are responsible for producing periodic oscillating signals that can be used by the mixer to up-convert the baseband signal at the carrier frequency. The output of an ideal LO can be represented as a pure sinusoidal waveform $\cos(\omega_c t)$ that would help to translate signals to the RF domain while preserving the original spectrum shape.

Figures 2A, 2B:
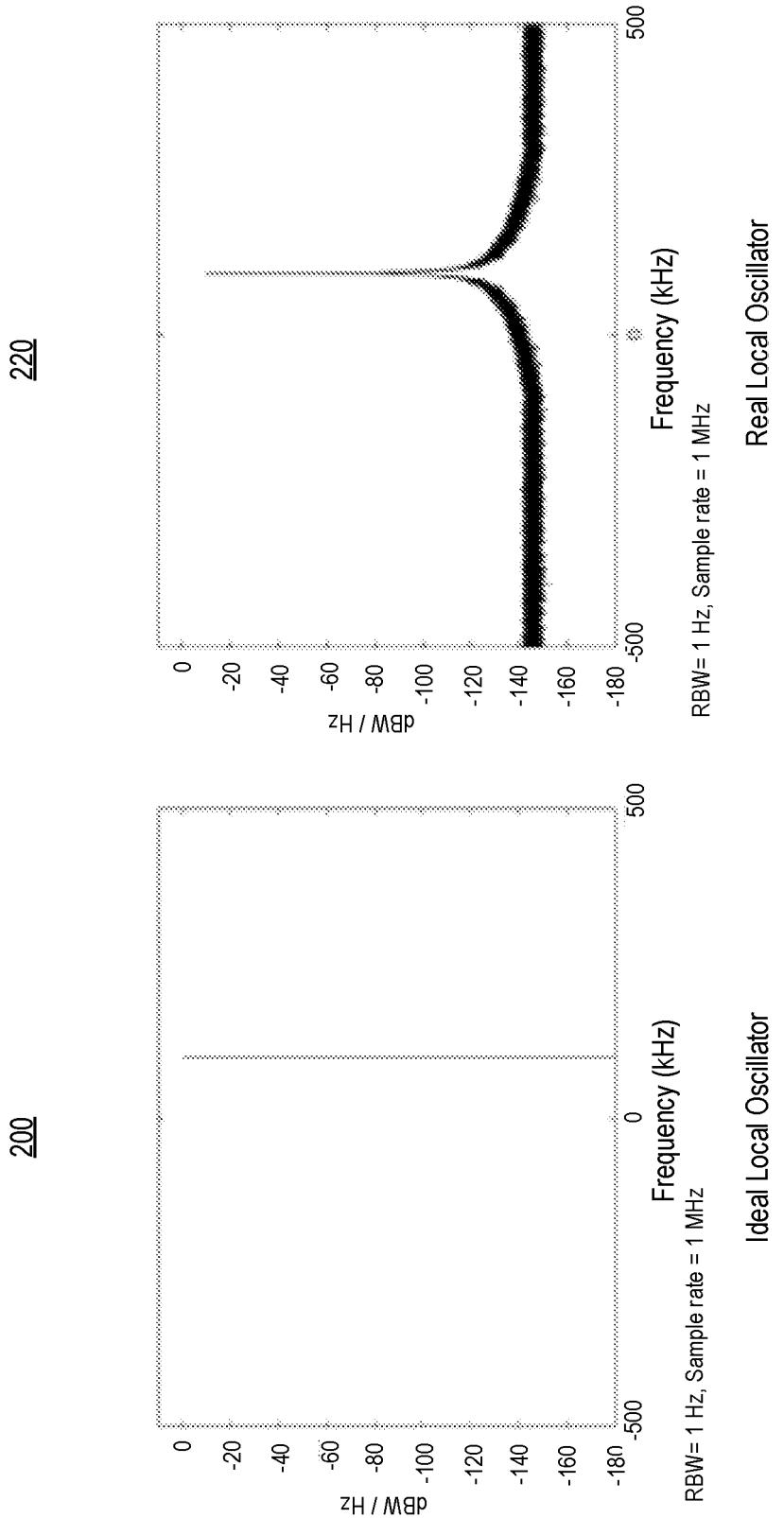
FIGS. 2A-B illustrate plots showing phase noise effect with an ideal local oscillator and a real local oscillator, respectively.

FIGS. 2A-B illustrate plots 200 and 220 showing the phase noise effect with an ideal local oscillator and a real local oscillator, respectively. FIG. 2A illustrates plot 200 showing the up-conversion of a baseband tone to 100 KHz using an ideal LO signal. Like the clock source issue in the DAC, the time domain instability of the generated signals by real LOs causes random phase fluctuations, known as phase noise, that expand the signal spectrum by introducing unwanted spectrum in both sides of the carrier frequency.

This can be seen in plot 220 of FIG. 2B which shows the same previous frequency translation (FIG. 2A), but using a real LO signal, which can be represented as $\cos(\omega_c t + \theta(t))$ with $\theta(t)$ being the phase noise term.

The phase noise manifests in different noises within the LO circuit, such as thermal noise and flicker noise. It can be quantified by measuring the power of the 1-Hz bandwidth at a frequency offset with respect to the carrier frequency. It results in a random rotation in the receiver signal constellation, thereby increasing the symbol detection error as well as the out-of-band noise level. To show this impact, consider mixing the in-phase baseband signal, $S_1(t)$, with an LO signal, $\cos(\omega_c t + \theta(t))$. After up-conversion, the mixer output can be expressed as:

$$S_{1\,RF}(t) = S_1(t)\cos(\omega_c t + \theta(t)) = S_1(t)\Re(e^{j\omega_c t}e^{j\theta(t)}) \tag{13}$$

where $e^{j\theta(t)}$ is the phase noise term, and $\Re(x)$ refers to the real part of complex x. Given $\theta(t)$ is small and using the approximation $e^{j\theta(t)} \approx 1 + j\theta(t)$, Eq. (13) can be rewritten as:

$$S_{1\,RF}(t) \approx S_1(t)\cos(\omega_c t) - S_1(t)\theta(t)\sin(\omega_c t) \tag{14}$$

It is seen from Eq. (14) that the transmitted signal is composed of an undistorted component and an LO-dependent, phase-noise distorted component of the up-converted signal. This LO-dependent component implies that phase noise can also be considered as one of the hardware impairments that can contribute to transmitters' signatures, and hence can be leveraged to increase device distinguishability.

The following section describes power amplifier nonlinearity distortion. The majority of circuit nonlinearity is attributed to power amplifiers (PAs) (e.g., PA 111), which are the last elements in the transmitter chain as shown in FIG. 1. They provide the modulated RF signals with the required radiation power to reach their destination. When a PA operates in the linear region, its I/O characteristics are deterministic, and an acceptable performance is ensured. However, operating in that region leads to more power consumption due to the associated low power efficiency characteristic. Since PAs are major power-hungry blocks, most of the transmitters drive their PAs to work near the saturation region to be more power efficient. Unfortunately, power efficiency and linearity of the PA conflict one another. Hence, the signal severely suffers from the nonlinearity of the PA when it works in the saturation region. The nonlinearity distortion results in amplitude compression, as well as in high adjacent channel power because of the bandwidth expansion, known as spectral regrowth. Although many linearization methods have been proposed to minimize the distortion and attenuate the spectral regrowth, PAs still exhibit some nonlinearity.

PA nonlinearity distortion is typically captured through the instantaneous amplitude and phase responses to changes in the amplitude of the input signal, respectively known as Amplitude-to-Amplitude (AM-AM) and Amplitude-to-Phase (AM-PM) distortion curves. Using the complex power series to model the bandpass nonlinearity of the PA, the PA output $S_{PA}(t)$ that models the instantaneous AM-AM and AM-PM distortions can be expressed as:

$$S_{PA}(t) = \sum_{n=0}^{\frac{N-1}{2}} \frac{\tilde{\alpha}_{2n+1}}{2^{2n}} \left\{ \binom{2n+1}{n+1} [A(t)^{2n}\tilde{S}(t)]1 \right\} e^{j\omega_c t} \tag{15}$$

Where $\tilde{\alpha}_i S$ are the complex coefficients of the model, N is the maximum order of nonlinearity, and $\tilde{S}(t) = S_1(t) + jS_Q(t)$ is again the complex baseband envelope of the signal. It can be inferred from Eq. (15) that the odd terms can be determined from single-tone complex compression characteristics, but fortunately, the odd-order terms are the most important as they produce intermodulation distortion in-band and adjacent to the desired signal. Each nonlinear RF component enjoys a variation of I/O characteristics, leading to a unique distortion that is captured by a unique set of coefficients $\tilde{\alpha}_i S$, and can therefore help in composing the device's unique signature in accordance with some embodiments.

The following section describes how out-of-band distortions are leveraged for robust device classification in accordance with various embodiments. Out-of-Band (OOB) emissions are the emissions in the frequencies immediately outside the message bandwidth that predominate the OOB domain. OOB domain (e.g., OOB spectra, band, or information) is defined as the frequency range separated from the assigned frequency of the emission by less than 250% of the message bandwidth. These emissions are mainly caused by the modulation and the nonlinear components of an RF transceiver front-end and result in in-band distortions as well as in an interference into adjacent channels. As a result, spectrum regulatory agencies, such as FCC and International Telecommunication Union (ITU), specify and regulate the permissible levels of the out-of-band (OOB) emissions of different emission classes using OOB spectral masks. Here, in-band domain (e.g., in-band spectra, band, or information) is defined as the frequency range within an allocated bandwidth for a particular protocol. For example, an in-band domain may reside between OOB emissions.

In variable-envelope modulation schemes (like 16 QAM), the spectrum of a modulated signal expands into adjacent channels when it passes through nonlinear components, resulting in an increase in the OOB emissions due to the spectral regrowth. The characteristics of a spectral regrowth are directly related to the unique coefficients of the corresponding nonlinear components in the RF transceiver chain.

The DAC impairments, also, can generate OOB emissions due to the quantization and clipping noise as explained in the previous section. The other major RF front-end component that contributes to the OOB emissions is the LO. Due to the phase noise that is impaired with the LOs, these OOB emissions cause both an in-band and out-of-band noise scaled by the signal power. The out-of-band spectrum of a Phase-Locked-Loop (PLL), which is a widely used block for frequency synthesis in application-specific IC designs, is a function of the Voltage-Controlled Oscillator (VCO) parameters. Despite efforts to reduce the OOB emissions, there is always some inevitable amount of the OOB emissions that can be tolerated by standards, but also can be exploited for providing unique device signatures in accordance with some embodiments. Various embodiments describe a device classification technique that exploits such OOB emissions to provide accurate and robust classification.

Based on the discussion about the relationship between the out-of-band emissions and the hardware impairments of RF front-end components, and the observations from various simulation studies described herein, leveraging in-band message bandwidth alone for providing device signatures does not lead to a robust device signature. Various embodiments consider both the in-band and out-of-band spectra by oversampling the captured signals at a receiver with an appropriate factor. Without any further processing, the raw IQ values obtained from the oversampled captured signals are then fed into a deep neural network to provide device identification and classification. The scheme of various embodiments use a Convolutional Neural Network (CNN), which is designed and tuned to recognize RF devices signatures and identify wireless devices. Technology advancements of transceiver designs (e.g., software defined and cognitive radios) can easily allow for sampling the captured signals in the out-of-band region, and therefore, the scheme of some embodiments can be implemented without using new and/or sophisticated receiver designs.

The following sections provides more depth and insights on out-of-band (OOB) spectrum distortions that arise from the transmitter hardware components that contribute significantly to these OOB distortions: power amplifier (PA), local oscillator (LO), mixers, and digital-to-analog converter (DAC).

With reference to the PA, Eq. (15) expresses the output signal of nonlinear or real PA as a function of all odd nonlinear terms. For ease of illustration, the third-order nonlinearity term is reviewed, when feeding the output signal, $S_{RF}(t)=A(t)\cos(\omega_c t+\theta(t))$, of the in-phase branch mixer as an input to the PA. In this case, the PA output is $S_{PA}(t)=\tilde{\alpha}_1 S_{RF}(t)+\tilde{\alpha}_3 S_{RF}^3(t)$, with the third-order nonlinearity term, $\tilde{\alpha}_3 S_{RF}^3(t)$, being:

$$\tilde{\alpha}_3 S_{RF}^3(t) = \frac{\tilde{\alpha}_3 A^3(t)}{4}[3\cos(\omega_c t + \varphi(t)) + \cos(3\omega_c t + 3\varphi(t))] \quad (16)$$

where $\tilde{\alpha}_1$ and $\tilde{\alpha}_3$ are again the complex coefficients modeling the nonlinearity terms. Note that given that the out-of-band component at $3\omega_c$ is located sufficiently far away from the center frequency, $\omega_c$, and that the bandwidth of the original signal is much less than $\omega_c$, this out-of-band component can easily be filtered out without causing any bandwidth regrowth around the original signal spectrum. However, the first term at $\omega_c$ may lead to spectrum regrowth of the original message bandwidth, depending, for example, on the modulation technique being used. For instance, in the case of constant-envelope modulation schemes such as BPSK where the amplitude A(t) is constant, the spectrum of the modulated signal in the vicinity of $\omega_c$ remains unchanged.

FIGS. 3A-B illustrate plots 300 and 320 showing the nonlinearly effect under Binary Frequency Shift Key (BFSK) modulation for linear power amplifier (PA) and non-linear PA, respectively. Plot 320 shows that the spectrum of a BFSK modulated signal has not changed after passing through a nonlinear PA. Note that the shape of the spectrum is the same under both linear and nonlinear PAs shown in plots 300 and 320.

However, for variable-envelope modulation schemes such as 16 QAM where the amplitude A(t) varies over time, because the $\tilde{\alpha}_3^3 A^3(t)/4$ term generally exhibits a broader spectrum than A(t) itself, nonlinearity causes spectral regrowth. For this case of modulation, the severity of the spectral growth also depends on the nonlinearity model parameter $\tilde{\alpha}_3$.

FIGS. 4A-C illustrate plots 400, 420, and 430 showing the nonlinearity effect under 16 Quadrature Amplitude Modulation (QAM) for linear PA, non-linear PA 1 and non-linear PA 2, respectively. FIGS. 4A-C illustrate the case of a 16 QAM modulated signal passing through a linear PA (FIG. 4A) and two nonlinear PAs (FIG. 4B and FIG. 4C) each under slightly different nonlinearity parameters. Two observations are made from these results.

First, the nonlinearity of the PA does lead to an out-of-band spectrum growth (or distortion). Second, even a slight difference in the nonlinearity impairments causes differences in the amplitude of the frequency components in the out-of-band domain, as observed from the indicated amplitudes of the spikes. That is, even a slight nonlinearity impairment difference causes quite different out-of-band spectrum distortions. The classification technique of various embodiments exploits this out-of-band distortion information to increase both the accuracy and scalability of device classification. In modern transceivers, LOs are usually made with Phase-Locked Loops (PLLs) that ensure high-frequency stability and minimum phase noise.

Figure 5:
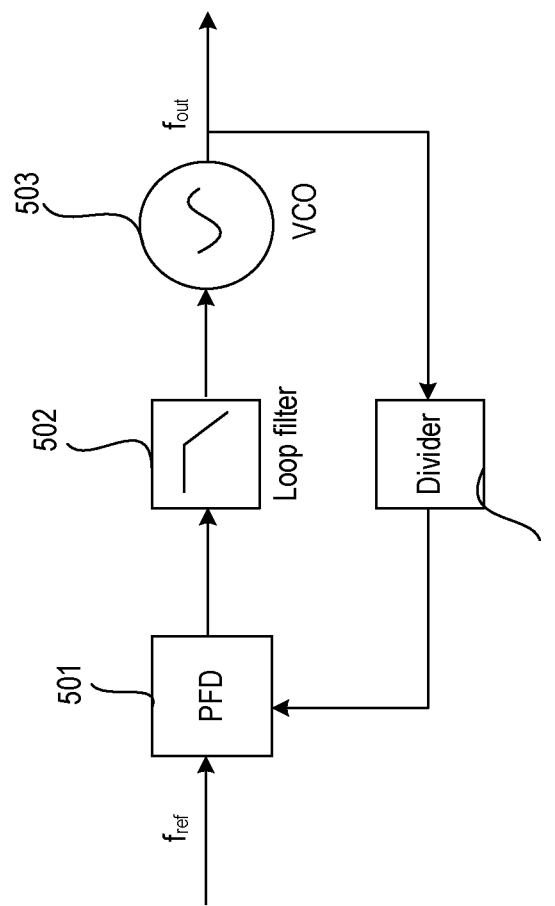
FIG. 5 illustrates a Phase Locked Loop (PLL).

FIG. 5 shows a simple schematic of PLL 500. PLL 500 comprises phase frequency detector (PFD) 501, loop filter 502, voltage-controlled oscillator (VCO) 503, and divider 504 coupled as shown. Here, $f_{ref}$ is the reference frequency and $f_{out}$ is the output frequency. Looking into the transfer functions of a PLL's components, which comprise the closed-loop transfer function of PLL 500, provides an insight into the noise contribution of each of them. The transfer function of PLL 500 from the reference frequency to VCO 503, for example, has a low-pass characteristic and can be expressed as:

$$H_{ref}(s) = \frac{R(2\epsilon\omega_n s + \omega_n^2)}{s^2 + 2\epsilon\omega_n s + \omega_n^2} \quad (17)$$

where R is the feedback divider and $\omega_n$ and $\in$ are the natural frequency and the damping coefficient, respectively. The transfer function of VCO 503, on the other hand, has a high-pass characteristic and can be defined as:

$$H_{VCO}(s) = \frac{s^2}{(s^2 + 2\epsilon\omega_n s + \omega_n^2)} \quad (18)$$

Hence, in-band phase noise of PLL 500 is dominated by the three components described above that have low-pass characteristics, while the out-of-band noise is mainly a function of the impaired VCO. To illustrate the impact of phase noise on out-of-band distortion, consider the mixer output signal in the in-band path, $S_{1_{RF}}(t) = S_1(t)\cos(\omega_c t + \theta(t))$ as given as in Eq. (13), where $\theta(t)$ is again the LO phase noise. Applying the Fourier transform to both sides of this mixer output equation yields:

$$F[S_{1\,RF}(t)] = \tfrac{1}{2}\{S_1(f-f_c)*F[e^{j\theta(t)}] + S_1(f-f_c)*F[e^{-j\theta(t)}]\} \quad (19)$$

where $f_c = 2\pi\omega_c$, $S_1(f) = F[S_1(t)]$, and $F[\cdot]$ and $*$ are the Fourier transform and convolution operators. Eq. (19) shows that there is a bandwidth expansion around the carrier frequency $f_c$ beyond the spectrum of the original signal, resulting from the convolution of the original signal spectrum and the spectrum of LO impairment term $e^{-j\theta(t)}$.

Figures 6A, 6B, 6C:
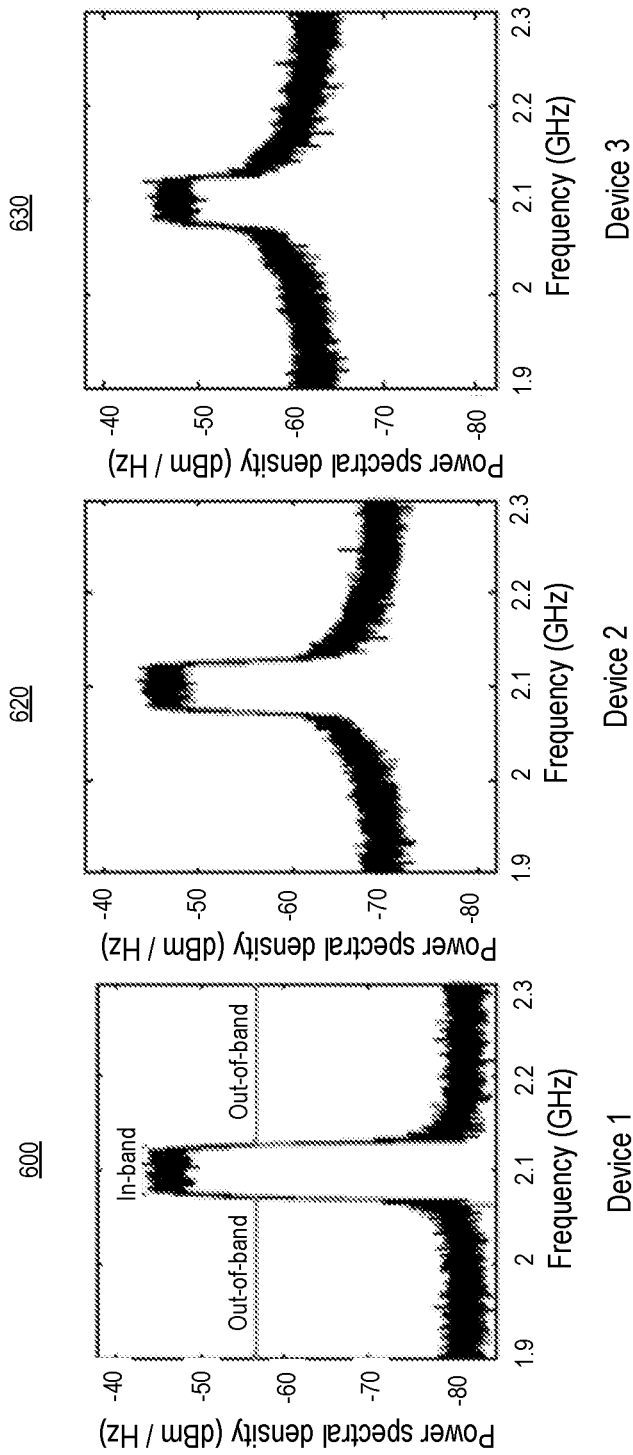
FIGS. 6A-C illustrate plots showing the phase noise effect for device 1 (ideal), device 2 (−80 dBC/Hz), device 3 (−72 dBC/Hz) at a frequency offset of 1 MHz, respectively.

FIGS. 6A-C illustrate plots 600, 620, and 630 showing the phase noise effect for device 1 (ideal), device 2 (−80 dBC/Hz), and device 3 (−72 dBC/Hz) at a frequency offset of 1 MHz, respectively. Since the spectrum expansion (or regrowth) is a function of the LO phase noise term, $e^{\theta(t)}$, different devices will exhibit different spectral regrowth; i.e., different out-of-band distortions. This is seen in FIGS. 6A-C, where the power spectral density (PSD) of three simulated devices, each with different phase noise value, but at the same frequency offset, are displayed. Device 1 enjoys an ideal LO (i.e., zero phase noise value), while device 2 and device 3 suffer from a phase noise value of −80 and −72 dBc/Hz, respectively, at the same frequency offset, 1 MHz.

Therefore, considering the out-of-band information makes the spectra of devices more discernible and thus enhances the performance of the classifier. The classification technique of various embodiments exploits out-of-band distortion information caused by LO phase noise to improve classification accuracy and device separability.

This section describes the role of mixers in the out-of-band emissions. Beside the relatively large DC component at the center of the signal spectrum that real mixers introduce, the nonlinearity of the mixer also introduces other undesired harmonic spurs within the out-of-band domain. The amplitude of the DC component and its harmonics depend on both the silicon level circuitry of the mixer and the second-order nonlinearity distortion of the device. This can be clearly observed by comparing the amplitudes of the spikes shown in the PSD of the three simulated devices in FIGS. 7A-C.

FIGS. 7A-C illustrate plots 700, 720, and 730 showing DC offset effect for device 1 (ideal mixer with DC offset=0), device 2 (DC offset: I=0.9 and Q=0.9), device 3 (DC offset I=0.5 and Q=0.5), respectively. Device 1 mimics an ideal mixer (i.e., zero DC offset), while device 2 and device 3 mimic real mixers with in-phase DC offset values of 0.9 and 0.5 and quadrature offset values of 0.9 and 0.5, respectively.

It can be observed FIGS. 7A-C that ideal mixers do not yield any DC component nor its harmonics, whereas hardware-impaired, real mixers yield DC spurs at the center of the spectrum as well as in the out-of-band region. Also, it can be observed that the amplitudes of the DC spurs of device 2 and device 3 occurring in both the in-band and the out-of-band spectrum are different from one another, even though the differences between their DC offset values are insignificant. Therefore, a transmitter's DC component and its harmonic spurs caused by mixer impairments can potentially be leveraged for providing unique device signatures that can be used for device classification. The classification technique of various embodiments leverages the out-of-band information that captures the differences between the DC offset harmonic spurs of devices to increase device separability classification accuracy.

The following section describes the role of Digital-to-Analog converters (DACs) in generating out-of-band emissions. DACs also suffer from nonlinearities and hardware impairments that can be exploited to provide unique features and signatures for devices. In addition to degrading the error vector magnitude (EVM) of a transmitter, DAC impairments are responsible for generating out-of-band (OOB) emissions as well. To quantify and illustrate these OOB distortions, refer to Eq. (1), which models the DAC output when considering the in-phase signal component, $S_I[n]$, as its input, while capturing the three main distortions, horizontal quantization (HQ), vertical quantization (VQ), and clock source modulation (CM), caused by the DAC.

Although this section focuses on the in-phase (I) path component for illustration purposes, similar analysis and illustration can be done for the case of the quadrature (Q) path component. Even though each of the three DAC impairments, HQ, VQ, and CM, yields OOB emissions, HQ contributes the most when the DAC generation frequency is not sufficiently greater than the Nyquist rate, and hence, the following section focuses on HQ's impact in this illustration.

Using Fourier series representations, the HQ term, $y_{S_I}^{HQ}(t)$, can be written as $y_{S_I}^{HQ}(t) = \sum_{n=-\infty}^{\infty} c_k^{HQ} e^{j2\pi k f_\Omega t}$, with the Fourier coefficients $c_k^{HQ}$ being.

$$c_k^{HQ} = \frac{1}{T_\Omega} \int_0^{T_\Omega} \left( \sum_{n=-\infty}^{\infty} S_I[n] g\left(\frac{t - nT_g}{T_g}\right) - S_I(t) \right) e^{-j2\pi k f_\Omega t} dt \quad (20)$$

where $T_\Omega$ is the time period of the three distortion additive terms in Eq. (1), which is the least common period of the three periods: output signal period, $T_0$, DAC generation period, $T_g$, and the clock modulation period, $T_m$.

Leveraging the fact that $g(\theta)$ is a unitary pulse when $0 \le \theta < 1$ and $T_\Omega = ZT_g$ the integral can be extended to $(-\infty, \infty)$, while restricting the index n in the first term from 0 to Z−1 and introducing a unitary window in the second term $W_{[0, T_\Omega]}$. Then Eq. (20) is rewritten as:

$$c_k^{HQ} = \frac{1}{T_\Omega} \int_{-\infty}^{\infty} \left( \sum_{n=0}^{Z-1} S_I[n] g\left(\frac{t - nT_g}{T_g}\right) - S_I(t) W_{[0, T_\Omega]} \right) e^{-j2\pi k f_\Omega t} dt \quad (21)$$

By Fourier-analyzing the second term in the right-hand side of Eq. (21), it is observed that the spectral contribution of the second term would be samples of the spectrum of the distorted version of $S_1(t)$ at frequencies $kf_Q$, where k ranges from 0 to Z−1, which lie mostly outside the bandwidth of $S_1(t)$. Therefore, most effects of the $y_{S_1}^{IQ(t)}$ term lie outside the bandwidth of $S_1(t)$, resulting in the growth of the number of attenuated replicas in the out-of-band domain of the signal $S_1(t)$.

The following section describes the performance evaluation and analysis. Here, MATLAB's Communications toolbox is used to design a simulation model of a full wireless communications processing chain for 5 different devices. Each device represents a transmitter that sends 16 QAM modulated signals over an Adaptive White Gaussian Noise (AWGN) channel. Different RF impairment blocks are used to introduce and set different values for IQ imbalance, DC offset, carrier frequency offset, phase noise, and PA nonlinearity distortion.

Table I shows the different transceiver hardware impairment values used in an experiment.

TABLE 1

| RF | IQ-amp (DB) | IQ-phase (Deg) | I-DC offset | Q-DC offset | AM-AM | AM-PM | Phase noise (dBc/Hz) | Frequency Offset (Hz) |
|---|---|---|---|---|---|---|---|---|
| Device1 | 0.08 | 0.1 | 0.1 | 0.15 | [2.178, 1.12157] | [4.0893, 9.2040] | [−60, −80] | [20, 200] |
| Device2 | 0.1 | 0.09 | 0.109 | 0.1 | [2.197, 1.16157] | [4.13, 9.2540] | [−60, −80] | [20, 200] |
| Device3 | 0.09 | 0.09 | 0.1 | 0.1 | [2.16, 1.10157] | [4.033, 9.2840] | [−59.9, −80] | [20, 200.9] |
| Device4 | 0.109 | 0.108 | 0.1 | 0.1 | [2.17, 1.12157] | [4.113, 9.2040] | [−60, −80.1] | [20, 200] |
| Device5 | 0.1 | 0.099 | 0.099 | 0.1 | [2.1587, 1.15157] | [4.133, 9.2040] | [−60, −80] | [20.1, 200] |

IQ imbalance values are shown in first and the second columns of the table, where the first one represents the amplitude mismatch, IQ-amp, and the second column represents the phase deviation, IQ-phase. The in-phase DC offset and the quadrature DC offset values are presented in the third and fourth columns. The PA nonlinearity distortion is represented in the fifth and sixth columns by the alpha and beta parameters of Saleh model functions of the Amplitude-to-Amplitude (AM-AM) and Amplitude-to-Phase (AM-PM) distortion curves. The last two columns of Table 1 show the LO phase noise introduced by a filtered Gaussian noise using a spectral mask specified by noise level and the frequency offset vectors.

For each device, the raw IQ values are collected of two different bandwidths, 2.075-2.125 GHz, which represents the bandwidth of the message (in-band), and 1.9-2.3 GHz, which includes both in-band (message bandwidth) and out-of-band domain. Here, 200 k samples are generated for each device, which are divided into training, validation, and test sets.

Figure 8:
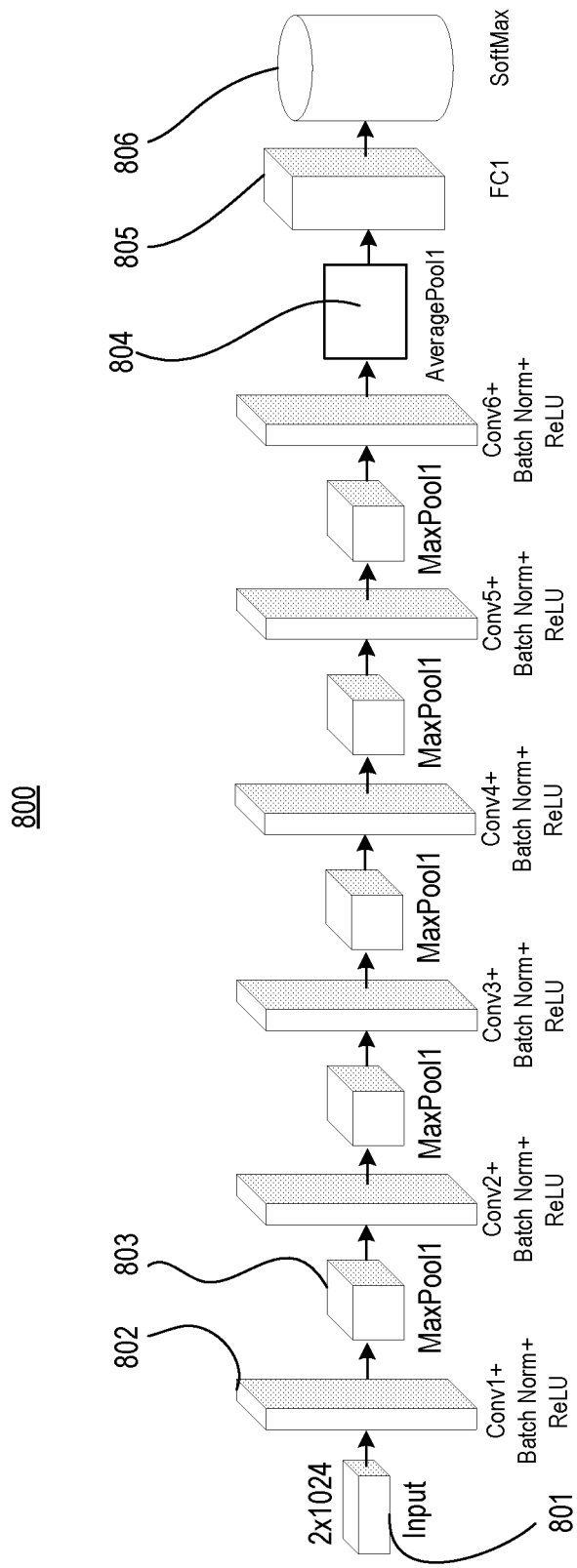
FIG. 8 illustrates a Convolutional Neural Network (CNN) architecture, in accordance with some embodiments.

FIG. 8 illustrates Convolutional Neural Network (CNN) architecture 800, in accordance with some embodiments. A CNN architecture is designed that uses raw time-series IQ samples generated by a Simulink model. A variation of the CNN architecture is used, which is depicted in FIG. 8. Specifically, each IQ input sequence is represented as a two dimensional real-valued tensor 801 of size, for example, 2×1024. Thus, the in-phase (I) and quadrature (Q) components are processed independently and in the fully connected layer where the information of the two components are combined. The input is fed to the first convolutional layer (Conv1), which comprises 16 filters, each of size 1×4. In other embodiments, other filter size may be used. Each filter learns 4-sample variations in time over the I or Q dimension separately to generate 16 distinct feature maps over the complete input sample.

Each ConvLayer is followed by a Batch normalization layer, a Rectified Linear Unit (ReLU) activation (e.g., together referred to by 802), and a maximum pooling (MaxPool) layer 803 with filters of size, for example, 1×2, and stride to perform a pre-determined non-linear transformation on each element of the convolved output, except the last ConvLayer, which is followed by an Average Pooling (AP) layer 804 with a dimension, for example, 1×32. The dimensions and filter size here are examples and other values may be used in other embodiments. The output of the AP layer 804 is then provided as an input to the Fully Connected (FC) layer 805, which has, for example, 5 neurons. In other embodiments, other number of neurons may be used. Then, the output of FC layer 805 is finally passed to a classifier layer 806. To overcome overfitting, the dropout rate is set to, for example, 0.5 at the dense layers. In other embodiments, a different dropout rate may be used. In some embodiments, Softmax classifier 806 is used in the last layer to output the probabilities of each frame being fed to the CNN. In other embodiments, other classifiers may be used. Weights are trained using stochastic gradient descent with momentum optimizer with an initial learning rate of, for example, 1=0.02 and a learning rate drop factor of, for example, 0.1 with a learning rate drop period of, for example, 9. The prediction error is minimized through backpropagation, using categorical cross-entropy as a loss function computed on the classifier output. In one example, CNN architecture in MATLAB is implemented using the Deep Learning Toolbox running on a system with Intel Corei7 8th Gen CPU.

Figure 9:
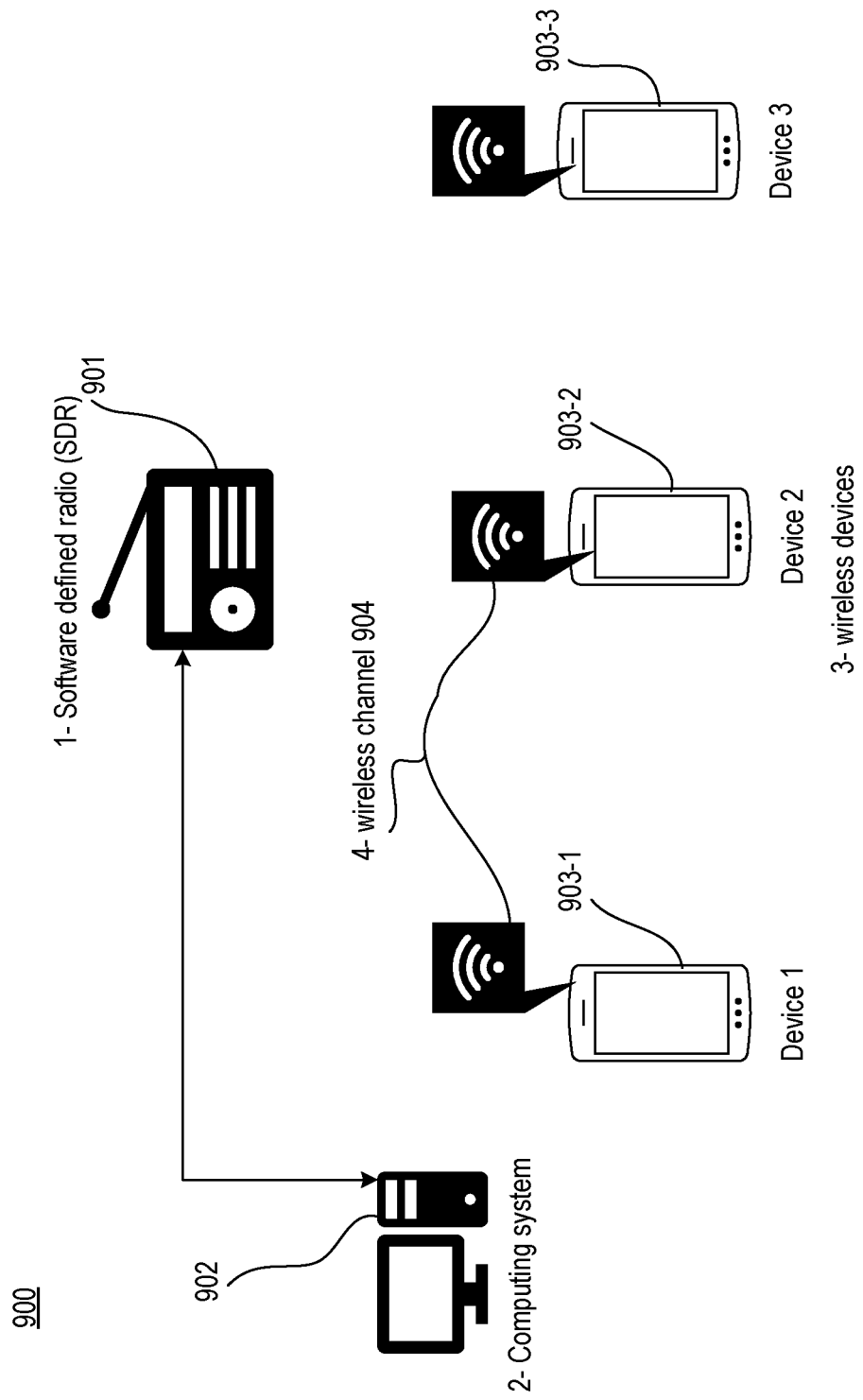
FIG. 9 illustrates a system showing an environmental context, in accordance with some embodiments.

FIG. 9 illustrates system 900 showing an environmental context, in accordance with some embodiments. Here, component 1 is a Software Defined Network (SDR) 901. This component can be any network subsystem with software defined radio and data collection capabilities. Component 2 is a Computing System 902. This component can be a computer, server, Jetson Nano, basically any computing system that can receive live-captured data and run deep learning algorithms. In various embodiments, Computing System 902 executes the classification scheme discussed with reference to FIG. 8 (e.g., CNN network 800). In some embodiments, Computing System 902 includes machine-readable media that stores instructions for classifying the various wireless devices as discussed with reference to various embodiments. Computing System 902 can be a local computer, a private server, a cloud computing device, a distributed system, etc.

Component 3 represents wireless devices (e.g., wireless devices 903-1, 903-2, and 903-3). Any wireless device that can sense and transmit data can serve as component 3. For example, a wireless device can be mobile phone, a laptop, a HAM radio, etc. Component 4 is Wireless channel 904. This component truly affects the signals which directly affect the classification accuracy. The system diagram of system 900 is very similar to other wireless classification systems. However, one difference is in the data collection system configuration. The scheme of various embodiments configures the data collection system to capture both the in-band and the out-of-band information of a given signal.

In some embodiments, the environmental context is a base station (e.g., eNode-B (eNB)) or an edge device. In some embodiments, the base station comprises a processor, a memory coupled to the processor, and receiver. In some embodiments, the memory stores weights associated with a machine-learning model that is used to classify a wireless device based on an in-band information and an out-of-band information from the wireless device. In some embodiments, the receiver receives a first in-band information and a first out-of-band information from a first wireless device. In some embodiments, the processor applies the weights to the machine-learning model to determine whether the first wireless device is a valid device or an invalid device. In some embodiments, the first wireless device (e.g., 903-1) is an eNB. In some embodiments, the machine-learning model is trained to generate the weights that are stored in the memory. In some embodiments, the receiver (e.g., radio 901) is configured to collect data to capture the first in-band information and the first out-of-band information. In some embodiments, the base station is one of an access-point or a base-station for a cellular communication network.

FIG. 10 illustrates flowchart 1000 of the scheme of various embodiments. While various blocks are illustrated in a particular order, the order can be modified. For example, some blocks can be performed before others while some blocks are performed in parallel. The blocks of flowchart 1000 can be performed by software and/or hardware. For example, flowchart 1000 may be executed by computing system 902.

At block 1001, the data collecting device is configured with the appropriate configuration. This configuration captures both the in-band and out-of-band information. At block 1002, the captured data is saved, labeled, and sent to a machine learning system to train the neural network. At block 1003, after training the network, the weights are saved, and then used in the computing system for inference scenarios. At block 1004, a wireless device starts to transmit and at block 1005 a receiver begins to collect the data. The collected data is then sent to a computing system (e.g., computing system 902 such as one described in FIG. 13) which processes the collected data for classification using the trained neural network. At block 1006, a determination is made regarding whether the computing system has processed the collected data for the wireless device. Based on the processed information, the computing system determines the identity of the wireless device (i.e., the wireless device is classified) as a valid device (as shown in block 1007) or an invalid device (as shown in block 1008). The process then continues with block 1003 where another wireless device is triggered and the process is repeated for any wireless device that needs to be identified. The flowchart of FIG. 10 can be implemented in software, hardware, or a combination of both.

In some embodiments, capturing out-of-band information for enabling accurate classification can be done using existing software-defined radios at the receiver side. Little to no change may be done at the transmitter side. The scheme of various embodiments outperforms existing approaches substantially. For example, the scheme achieves around 96% accuracy even when the transmitters have very similar features (worst-case scenario). The scheme is also simple in that capturing the out of band information can be done using radios with software defined capabilities.

The scheme of various embodiments can be used for indoor localization. In this application, device finger printing is used to accurately determine the location of the corresponding device in an indoor environment. The scheme of various embodiments can be used in 5G network deployment. For 5G networks, fingerprinting can be used for network security purposes and during the beamforming process. In some embodiments, the scheme can be implemented as an additional security layer in IoT (Internet-of-Things) gateways and access points where it is integrated in the system. Hence, the scheme of various embodiments can be used in Radio, IoT technologies, and mobile cellular technologies, for example. In some embodiments, the scheme can be implemented in cellular base stations for both eNode-B and IoT devices and gNode-B for 5G cellular devices. One of the functionalities of the cell is to establish the connection for new devices and give them access to the resource. Hence, the scheme of various embodiments can be a very efficient tool to detect the spoofed device and increase the security of the cell. The scheme of various embodiments can be used in testing devices that could be used by regulatory agencies to scan and monitor the spectrum and determine illegal users.

FIGS. 11A-B illustrate plots 1100 and 1120 showing training and validation accuracy of the scheme of FIG. 10 that uses in-band and out-of-band radiation, and existing technique, respectively. The following section evaluates and compares the performance of the technique of various embodiments, leveraging both in-band and out-of-band spectrum distortions, and the conventional classification technique, using in-band distortion information only. The impairments' values used in this experiment, which are shown in Table I, are set very similar to one another so that the devices resemble bit-similar radios to make the identification task even harder.

The generated frames are divided into 80% training, 10% validation, and 10% testing. As seen from FIGS. 11A-B, the training accuracy (curves 1101 and 1121) of the technique of various embodiments outperforms the traditional classifier that uses in-band information only. The experiments show that the out-of-band additional processing exploited in the technique of various embodiments does not incur an increase in the computation time of the method; the running times of the reported results are 97.38 and 96.35 minutes for the in-band only technique and the in-band and out-of-band technique, respectively. Also, from the validation accuracy (the black dotted lines 1102 and 1122), it can be inferred that the model used here does not suffer from overfitting.

Figures 12A, 12B:
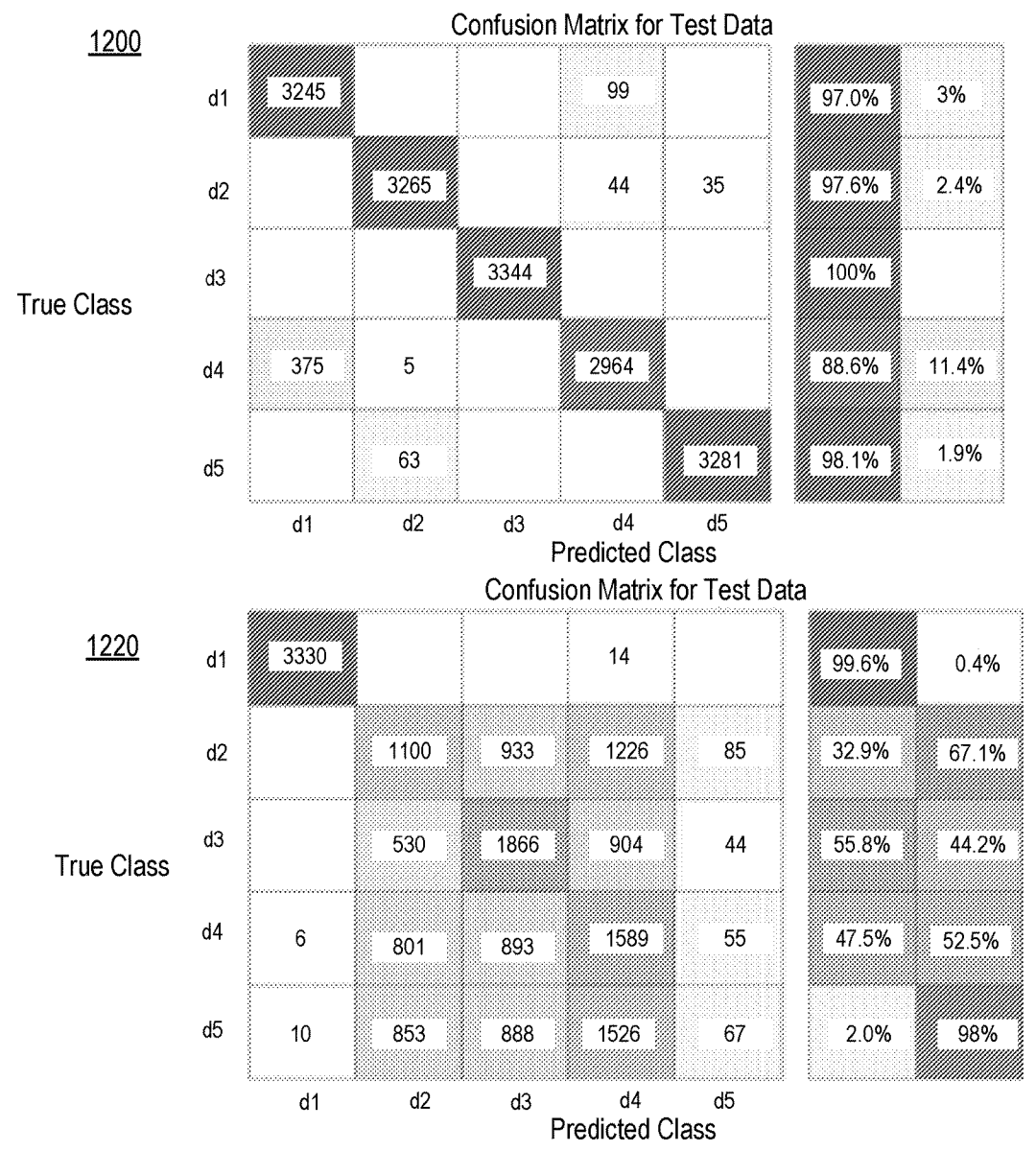

FIGS. 12A-B illustrate confusion matrices 1200 and 1220 for the scheme of FIG. 10 that uses in-band and out-of-band radiation, and an existing technique, respectively. The confusion matrices 1200 and 1220 results depicted in FIGS. 12A-B show that the technique of various embodiments achieves substantially higher classification accuracy than the in-band only technique. The testing accuracy obtained under the technique of various embodiments across the five tested devices is 96.2% whereas that obtained under the in-band only approach is merely 48.6%. Similar results are also obtained when considering the 8-PSK modulation scheme as opposed to the 16 QAM scheme.

The technique of various embodiments achieves much higher accuracy because it leverages, in addition to the in-band distortion information already exploited by the prior methods, out-of-band distortion information caused by the different radio hardware components, which, as explained in the previous sections, provide unique device signatures that lead to substantial increase in device separability.

Here the experiments indicate that this accuracy gap between the technique of various embodiments and the prior in-band only method is inversely proportional to the hardware impairments variability among devices. This means that both techniques enjoy high classification accuracy when the devices exhibit relatively high hardware impairments. However, as technology advancements continue to reduce such impairments, the variability among the hardware impairments across different devices continues to shrink, making the reliance on in-band only information for device classification inefficient and inaccurate. The technique of various embodiments leverages out-of-band distortion in addition to in-band information to provide high device separability performance.

Figure 13:
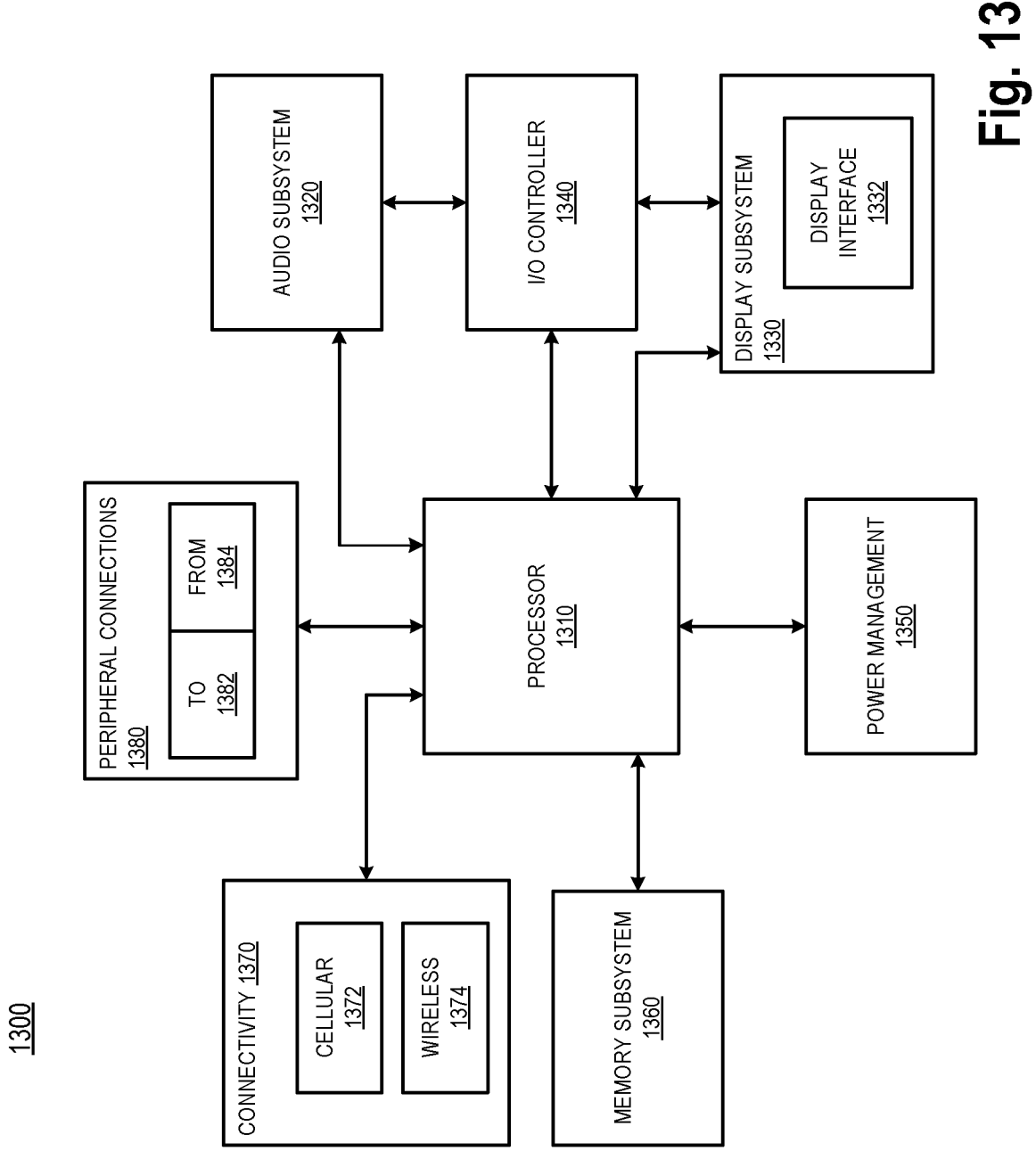
FIG. 13 illustrates a computer system having machine-readable media with instructors for executing the scheme of various embodiments.

FIG. 13 illustrates a block diagram of an embodiment of a computing device to execute the scheme of various embodiments. In some embodiments, computing device 1300 represents an appropriate computing device, such as a computing tablet, a mobile phone or smart-phone, a laptop, a desktop, an IOT device, a server, a set-top box, a wireless-enabled e-reader, or the like. It will be understood that certain components are shown generally, and not all components of such a device are shown in computing device 1300.

In some embodiments, computing device 1300 includes processor 1310, audio subsystem 1320, display subsystem 1330, I/O controller 1340, power management 1350, memory subsystem 1360, connectivity 1370, and peripheral connections 1380.

In one embodiment, processor 1310 can include one or more physical devices, such as microprocessors, graphics processor, accelerator, inference logic, computational processor, application processors, microcontrollers, programmable logic devices, or other processing means. The processing operations performed by processor 1310 include the execution of an operating platform or operating system on which applications and/or device functions are executed. The processing operations include operations related to I/O (input/output) with a human user or with other devices, operations related to power management, and/or operations related to connecting the computing device 1300 to another device. The processing operations may also include operations related to audio I/O and/or display I/O. In some embodiments, processor 1310 executes the scheme for identifying wireless devices by capturing out-of-band information in addition to in-band information from wireless devices for enabling accurate classification of wireless devices. Both the in-band and out-of-band spectrum emissions of the received signal are used to capture hardware signatures and features.

In some embodiments, computing device 1300 includes audio subsystem 1320, which represents hardware (e.g., audio hardware and audio circuits) and software (e.g., drivers, codecs) components associated with providing audio functions to the computing device. Devices for such functions can be integrated into computing device 1300 or connected to the computing device 1300. Audio functions can include speaker and/or headphone output, as well as microphone input. In some embodiments, a user interacts with the computing device 1300 by providing audio commands that are received and processed by processor 1310.

Display subsystem 1330 represents hardware (e.g., display devices) and software (e.g., drivers) components that provide a visual and/or tactile display for a user to interact with the computing device 1300. Display subsystem 1330 includes display interface 1332, which includes the particular screen or hardware device used to provide a display to a user. In one embodiment, display interface 1332 includes logic separate from processor 1310 to perform at least some processing related to the display. In one embodiment, display subsystem 1330 includes a touch screen (or touch pad) device that provides both output and input to a user.

I/O controller 1340 represents hardware devices and software components related to interaction with a user. I/O controller 1340 is operable to manage hardware that is part of audio subsystem 1320 and/or display subsystem 1330. Additionally, I/O controller 1340 illustrates a connection point for additional devices that connect to computing device 1300 through which a user might interact with the system. For example, devices that can be attached to the computing device 1300 might include microphone devices, speaker or stereo systems, video systems or other display devices, keyboard or keypad devices, or other I/O devices for use with specific applications such as card readers or other devices.

As mentioned above, I/O controller 1340 can interact with audio subsystem 1320 and/or display subsystem 1330. For example, input through a microphone or other audio device can provide input or commands for one or more applications or functions of the computing device 1300. Additionally, audio output can be provided instead of, or in addition to display output. In another example, if display subsystem 1330 includes a touch screen, the display device also acts as an input device, which can be at least partially managed by I/O controller 1340. There can also be additional buttons or switches on the computing device 1300 to provide I/O functions managed by I/O controller 1340.

In one embodiment, I/O controller 1340 manages devices such as accelerometers, cameras, light sensors or other environmental sensors, or other hardware that can be included in the computing device 1300. The input can be part of direct user interaction, as well as providing environmental input to the system to influence its operations (such as filtering for noise, adjusting displays for brightness detection, applying a flash for a camera, or other features).

In one embodiment, computing device 1300 includes power management 1350 that manages battery power usage, charging of the battery, and features related to power saving operation. In some embodiments, a power management system 1350 controls the power consumption of processor 1310. For example, power management system 1350 can clock gate, power gate, or apply any other power management techniques.

In some embodiments, memory subsystem 1360 includes memory devices for storing information in computing device 1300. Memory can include nonvolatile (state does not change if power to the memory device is interrupted) and/or volatile (state is indeterminate if power to the memory device is interrupted) memory devices. Examples of nonvolatile memory include flash memory, magnetic memory, resistive memory. Examples of volatile memory include static random-access memory, dynamic random-access memory, etc. Memory subsystem 1360 can store application data, user data, music, photos, documents, or other data, as well as system data (whether long-term or temporary) related to the execution of the applications and functions of the computing device 1300.

Elements of embodiments are also provided as a machine-readable medium (e.g., memory 1360) for storing the computer-executable instructions (e.g., instructions to implement any other processes discussed herein). The machine-readable medium (e.g., memory 1360) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, machine-readable medium 1360 includes computer-executable instructions that when executed by processor 1310 cause processor 1310 to perform a method of identifying wireless devices by capturing out-of-band information in addition to in-band information from wireless devices for enabling accurate classification of wireless devices. In some embodiments, the method comprises applying a neural network trained using the first in-band information and the first out-of-band information. In some embodiments the method comprises receiving a first in-band information and a first out-of-band information from a first wireless device. In some embodiments, the method comprises identifying whether the first wireless device is a valid or invalid device based on applying the neural network which is trained to classify the wireless device. In some embodiments, the method comprises configuring a data collection device to capture the first in-band information and the first out-of-band information. In some embodiments, the method comprises training a machine-learning model to classify the wireless device based on the in-band information and the out-of-band information. In some embodiments, training the machine-learning model comprises determining weights for the machine-learning model and saving the weights in memory (e.g., memory 1360).

In some embodiments, applying the neural network trained to classify the wireless device based on the in-band information and the out-of-band information comprises multiplying the saved weights to an input for each layer to infer classification of the first wireless device. In some embodiments, the input comprises the first in-band information and the first out-of-band information. In some embodiments, in the training phase, the method comprises triggering the first wireless device to start transmission, wherein the transmission includes the first in-band information and the first out-of-band information. In some embodiments, in the training phase, the method comprises triggering a receiver to receive the first in-band information and the first out-of-band information from the first wireless device. In some embodiments, the method comprises notifying a user when the first wireless device is invalid.

The various embodiments of the present disclosure may also comprise a network interface within 1370 such as a wireless interface so that a system embodiment may be incorporated into a wireless device, for example, cell phone or personal digital assistant. Connectivity 1370 includes hardware devices (e.g., wireless and/or wired connectors and communication hardware) and software components (e.g., drivers, protocol stacks) to enable the computing device 1300 to communicate with external devices. The computing device 1300 could be separate devices, such as other computing devices, wireless access points or base stations, as well as peripherals such as headsets, printers, or other devices.

Connectivity 1370 can include multiple different types of connectivity. To generalize, the computing device 1300 is illustrated with cellular connectivity 1372 and wireless connectivity 1374. Cellular connectivity 1372 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1374 refers to wireless connectivity that is not cellular, and can include personal area networks (such as Bluetooth, Near Field, etc.), local area networks (such as Wi-Fi), and/or wide area networks (such as LTE), or other wireless communication.

Peripheral connections 1380 include hardware interfaces and connectors, as well as software components (e.g., drivers, protocol stacks) to make peripheral connections. It is understood that the computing device 1300 could both be a peripheral device ("to" 1382) to other computing devices, as well as have peripheral devices ("from" 1384) connected to it. The computing device 1300 commonly has a "docking" connector to connect to other computing devices for purposes such as managing (e.g., downloading and/or uploading, changing, synchronizing) content on computing device 1300. Additionally, a docking connector can allow computing device 1300 to connect to certain peripherals that allow the computing device 1300 to control content output, for example, to audiovisual or other systems.

In addition to a proprietary docking connector or other proprietary connection hardware, the computing device 1300 can make peripheral connections 1380 via common or standards-based connectors. Common types can include a Universal Serial Bus (USB) connector (which can include any of a number of different hardware interfaces), DisplayPort including MiniDisplayPort (MDP), High-Definition Multimedia Interface (HDMI), Firewire, Thunderbolt, or other types.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e.g., immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" refers to any continuous signal for which the time varying feature (variable) of the signal is a representation of some other time varying quantity, i.e., analogous to another time varying signal.

The term "digital signal" refers to a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits and logic blocks described here are metal oxide semiconductor (MOS) transistors or their derivatives. The MOS transistors include drain, source, gate, and bulk terminals or regions. The transistors and/or the MOS transistor derivatives also include Transistors, Tunneling FET (TFET), Tri-Gate and FinFET transistors, ferroelectric FET (FeFETs), Gate All Around Cylindrical Square Wire, or Rectangular Ribbon Transistors, or other devices implementing transistor functionality like carbon nanotubes or spintronic devices. MOSFETs have symmetrical source and drain terminals, so source and drain terminals are considered identical terminals and are interchangeably used here. Compared to a MOSFET, A TFET device has asymmetric source and drain terminals. Those skilled in the art will appreciate that other transistors, for example, CMOS, Bi-polar junction transistors (BJT PNP/NPN), BiCMOS, etc., may be used without departing from the scope of the disclosure.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art considering the foregoing description. The embodiments of the disclosure are intended to embrace all such alternatives, modifications, and variations as to fall within the broad scope of the appended claims. Where specific details are set forth to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any suitable manner.

Example 1: A machine-readable storage media having machine-readable instructions stored thereon, that when executed, cause one or more machines to perform a method comprising: applying a neural network trained to classify a wireless device based on in-band and out-of-band information; receiving a first in-band information and a first out-of-band information from a first wireless device; and identifying whether the first wireless device is a valid or invalid device based on applying the neural network and using the first in-band information and the first out-of-band information.

Example 2: The machine-readable storage media of example 1 having machine-readable instructions stored thereon, that when executed, cause the one or more machines to perform the method comprising: configuring a data collection device to capture the first in-band information and the first out-of-band information.

Example 3: The machine-readable storage media of example 2 having machine-readable instructions stored thereon, that when executed, cause the one or more machines to perform the method comprising: training a machine-learning model to classify the wireless device based on the in-band information and the out-of-band information.

Example 4: The machine-readable storage media of example 3, wherein training the machine-learning model comprises: determining weights for the machine-learning model; and saving the weights in memory.

Example 5: The machine-readable storage media of example 4, wherein applying the neural network trained to classify the wireless devices based on the in-band information and the out-of-band information comprises: multiplying the saved weights to an input to infer classification of the first wireless device, wherein the input comprises the first in-band information and the first out-of-band information.

Example 6: The machine-readable storage media of example 1 having machine-readable instructions stored thereon, that when executed, cause the one or more machines to perform the method comprising: triggering the first wireless device to start transmission, wherein the transmission includes the first in-band information and the first out-of-band information.

Example 7: The machine-readable storage media of example 6 having machine-readable instructions stored thereon, that when executed, cause the one or more machines to perform the method comprising: triggering a receiver to receive the first in-band information and the first out-of-band information from the first wireless device.

Example 8: The machine-readable storage media of example 1 having machine-readable instructions stored thereon, that when executed, cause the one or more machines to perform the method comprising: notifying a user when the first wireless device invalid.

Example 9: A base-station comprising: a processor circuitry; a memory coupled to the processor circuitry, wherein the memory is to store weights associated with a machine-learning model that is used to classify a wireless device based on an in-band information and an out-of-band information from the wireless device; and a receiver to receive a first in-band information and a first out-of-band information from a first wireless device, wherein the processor is to apply the weights to the machine-learning model and apply the first in-band information and the first out-of-band information to determine whether the first wireless device is a valid device or an invalid device.

Example 10: The base-station of example 9, wherein the first wireless device is a phone.

Example 11: The base-station of example 9, wherein the machine-learning model is trained to generate the weights that are stored in the memory.

Example 12: The base-station of example 9, wherein the receiver is configured to collect data to capture the first in-band information and the first out-of-band information.

Example 13: The base-station of example 9, wherein the base-station is one of an access-point or a base-station for a cellular communication network.

Example 14: A method comprising: applying a neural network trained to classify a wireless device based on in-band and out-of-band information; receiving a first in-band information and a first out-of-band information from a first wireless device; and identifying whether the first wireless device is a valid device or an invalid device based on applying the neural network and using the first in-band information and the first out-of-band information.

Example 15: The method of example 14 comprising: configuring a data collection device to capture the first in-band and the first out-of-band information.

Example 16: The method of example 14 comprising: training a machine-learning model to classify the wireless device based on the in-band information and the out-of-band information.

Example 17: The method of example 16, wherein training the machine-learning model comprises: determining weights for the machine-learning model; and saving the weights in memory.

Example 18: The method of example 17, wherein applying the neural network trained to classify the wireless device based on the in-band information and the out-of-band information comprises: multiplying the saved weights to an input to infer classification of the wireless device, wherein the input comprises the in-band information and the out-of-band information.

Example 19: The method of example 14 comprising: triggering the first wireless device to start transmission, wherein the transmission includes the first in-band information and the first out-of-band information; and triggering a receiver to receive the first in-band information and the first out-of-band information from the first wireless device.

Example 20: The method of example 14 comprises notifying a user when the first wireless device is invalid.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. A non-transitory machine-readable storage media having machine-readable instructions stored thereon, that when executed, cause one or more machines to perform a method comprising:
    applying a neural network trained to classify a wireless device based on in-band and out-of-band information;
    receiving a first in-band information and a first out-of-band information from a first wireless device; and
    identifying whether the first wireless device is a valid or an invalid device based on applying the neural network and using the first in-band information and the first out-of-band information.

2. The non-transitory machine-readable storage media of claim 1 having machine-readable instructions stored thereon, that when executed, cause the one or more machines to perform the method comprising:
    configuring a data collection device to capture the first in-band information and the first out-of-band information.

3. The non-transitory machine-readable storage media of claim 2 having machine-readable instructions stored thereon, that when executed, cause the one or more machines to perform the method comprising:
    training a machine-learning model to classify the wireless device based on the in-band information and the out-of-band information.

4. The non-transitory machine-readable storage media of claim 3, wherein training the machine-learning model comprises:
    determining weights for the machine-learning model; and
    saving the weights in memory.

5. The non-transitory machine-readable storage media of claim 4, wherein applying the neural network trained to classify the wireless device based on the in-band information and the out-of-band information comprises:
    multiplying the saved weights to an input to infer classification of the first wireless device, wherein the input comprises the first in-band information and the first out-of-band information.

6. The non-transitory machine-readable storage media of claim 1 having machine-readable instructions stored thereon, that when executed, cause the one or more machines to perform the method comprising:
    triggering the first wireless device to start transmission, wherein the transmission includes the first in-band information and the first out-of-band information.

7. The non-transitory machine-readable storage media of claim 6 having machine-readable instructions stored thereon, that when executed, cause the one or more machines to perform the method comprising:
    triggering a receiver to receive the first in-band information and the first out-of-band information from the first wireless device.

8. The non-transitory machine-readable storage media of claim 1 having machine-readable instructions stored thereon, that when executed, cause the one or more machines to perform the method comprising:
    notifying a user when the first wireless device invalid.

9. A base-station comprising:
    a processor;
    a memory coupled to the processor, wherein the memory is to store weights associated with a machine-learning model that is used to classify a wireless device based on an in-band information and an out-of-band information from the wireless device; and a receiver to receive a first in-band information and a first out-of-band information from a first wireless device, wherein the processor is to apply the weights to the machine-learning model and apply the first in-band information and first out-of-band information to determine whether the first wireless device is a valid device or an invalid device.

10. The base-station of claim 9, wherein the first wireless device is a mobile phone.

11. The base-station of claim 9, wherein the machine-learning model is trained to generate the weights that are stored in the memory.

12. The base-station of claim 9, wherein the receiver is configured to collect data to capture the first in-band information and the first out-of-band information.

13. The base-station of claim 9, wherein the base-station is one of an access-point or a base-station for a cellular communication network.

14. A method comprising:
applying a neural network trained to classify a wireless device based on in-band and out-of-band information;
receiving a first in-band information and a first out-of-band information from a first wireless device; and
identifying whether the first wireless device is a valid device or an invalid device based on applying the neural network and using the first in-band information and the first out-of-band information.

15. The method of claim 14 comprising:
configuring a data collection device to capture the first in-band and the first out-of-band information.

16. The method of claim 14 comprising:
training a machine-learning model to classify the wireless device based on the in-band information and the out-of-band information.

17. The method of claim 16, wherein training the machine-learning model comprises:
determining weights for the machine-learning model; and
saving the weights in memory.

18. The method of claim 17, wherein applying the neural network trained to classify the wireless device based on the in-band information and the out-of-band information comprises:
multiplying the saved weights to an input to infer classification of the wireless device, wherein the input comprises the in-band information and the out-of-band information.

19. The method of claim 14 comprises:
triggering the first wireless device to start transmission, wherein the transmission includes the first in-band information and the first out-of-band information; and
triggering a receiver to receive the first in-band information and the first out-of-band information from the first wireless device.

20. The method of claim 14 comprises notifying a user when the first wireless device is invalid.

* * * * *